US012639921B2

(12) United States Patent
Xu et al.

(10) Patent No.: US 12,639,921 B2
(45) Date of Patent: May 26, 2026

(54) VIDEO CLASSIFICATION METHOD AND APPARATUS

(71) Applicant: TENCENT MUSIC ENTERTAINMENT TECHNOLOGY (SHENZHEN) CO., LTD., Shenzhen (CN)

(72) Inventors: Dong Xu, Shenzhen (CN); Chengcheng Liu, Shenzhen (CN)

(73) Assignee: TENCENT MUSIC ENTERTAINMENT TECHNOLOGY (SHENZHEN) CO., LTD., Shenzhen (CN)

( * ) Notice: Subject to any disclaimer, the term of this patent is extended or adjusted under 35 U.S.C. 154(b) by 405 days.

(21) Appl. No.: 18/254,833

(22) PCT Filed: Oct. 22, 2021

(86) PCT No.: PCT/CN2021/125750
§ 371 (c)(1),
(2) Date: Sep. 20, 2023

(87) PCT Pub. No.: WO2022/111168
PCT Pub. Date: Jun. 2, 2022

(65) Prior Publication Data
US 2024/0296657 A1     Sep. 5, 2024

(30) Foreign Application Priority Data
Nov. 26, 2020     (CN) .......................... 202011350031.1

(51) Int. Cl.
*G06V 10/764*          (2022.01)
*G06V 40/20*           (2022.01)
(52) U.S. Cl.
CPC ............ *G06V 10/764* (2022.01); *G06V 40/20* (2022.01)

(58) Field of Classification Search
CPC .............................. G06V 10/764; G06V 40/20
See application file for complete search history.

(56) References Cited

U.S. PATENT DOCUMENTS 8,335,786 B2 * 12/2012 Pereira .................. G06F 16/783
                                                            707/747
11,282,509 B1 * 3/2022 Li ........................... G06F 16/65
(Continued)

FOREIGN PATENT DOCUMENTS

CN          106970950 A      7/2017
CN          107943291 A      4/2018
(Continued)

OTHER PUBLICATIONS

Reinolds, Francisco, Cristiana Neto, and José Machado. "Deep learning for activity recognition using audio and video." Electronics 11.5 (2022): 782. (Year: 2022).*

(Continued)

*Primary Examiner* — Utpal D Shah
(74) *Attorney, Agent, or Firm* — Kolitch Romano Dascenzo Gates LLP

(57)                    ABSTRACT

Provided is a method for classifying videos. The method comprises: acquiring a target audio and a corresponding target video comprising human body actions; determining, based on a human body action matching degree of each target frame in the target video relative to a corresponding reference frame in a reference video, a total human body action matching degree score of the target video relative to the reference video; determining, based on an audio matching degree of each target audio segment in the target audio relative to a corresponding reference audio segment in a reference audio of the reference video, a total audio matching degree score of the target audio relative to the reference audio; and determining, based on the total human body
(Continued)

Acquiring a target audio and a corresponding target video including human body actions ⟋ 101

Determining, based on a human body action matching degree of each target image frame in the target video relative to a corresponding reference image frame in a reference video, a total human body action matching degree score of the target video relative to the reference video ⟋ 102

Determining, based on an audio matching degree of each target audio segment in the target audio relative to a corresponding reference audio segment in a reference audio, a total audio matching degree score of the target audio relative to the reference audio ⟋ 103

Determining, based on the total human body action matching degree score and the total audio matching degree score, a comprehensive classification result ⟋ 104 action matching degree score and the total audio matching degree, a comprehensive classification result.

20 Claims, 7 Drawing Sheets

(56)                    References Cited

U.S. PATENT DOCUMENTS

| | | | | |
|---|---|---|---|---|
| 11,354,900 | B1 * | 6/2022 | Li | ........................... G06V 10/56 |
| 11,961,410 | B1 * | 4/2024 | Lin | ........................ G06N 20/00 |
| 2011/0305384 | A1 * | 12/2011 | Aoyama | ................. G10L 25/78 |
| | | | | 382/159 |
| 2015/0080072 | A1 | 3/2015 | Kim | |
| 2019/0114487 | A1 * | 4/2019 | Vijayanarasimhan | ....................... |
| | | | | G06V 20/30 |
| 2019/0289372 | A1 * | 9/2019 | Merler | ................... G06V 20/46 |
| 2020/0160581 | A1 * | 5/2020 | Heller | ...................... G10L 25/57 |
| 2021/0202090 | A1 * | 7/2021 | O'Donovan | ........... G16H 15/00 |
| 2021/0390748 | A1 * | 12/2021 | Liao | ........................ G06V 10/82 |

FOREIGN PATENT DOCUMENTS

| | | |
|---|---|---|
| CN | 109887524 A | 6/2019 |
| CN | 111081277 A | 4/2020 |
| CN | 112487940 A | 3/2021 |
| WO | 2013141522 A1 | 9/2013 |

OTHER PUBLICATIONS

Huang, Yin-Fu, and Shih-Hao Wang. "Movie genre classification using svm with audio and video features." International Conference on Active Media Technology. Berlin, Heidelberg: Springer Berlin Heidelberg, 2012. (Year: 2012).*

Subashini, K., S. Palanivel, and V. Ramaligam. "Audio-video based segmentation and classification using SVM." 2012 Third International Conference on Computing, Communication and Networking Technologies (ICCCNT'12). IEEE, 2012. (Year: 2012).*

Tsuchida, Shuhei, Satoru Fukayama, and Masataka Goto. "Query-by-dancing: a dance music retrieval system based on body-motion similarity." International Conference on Multimedia Modeling. Cham: Springer International Publishing, 2018. (Year: 2018).*

International Search Report of the International Searching Authority for State Intellectual Property Office of the People's Republic of China in PCT application No. PCT/CN2021/125750 issued on Dec. 9, 2021, which is an international application to which this application claims priority.

The State Intellectual Property Office of People's Republic of China, First Office Action in Patent Application No. 202011350031.1 issued on Mar. 11, 2022, which is a foreign counterpart application corresponding to this U.S. Patent Application, to which this application claims priority.

The State Intellectual Property Office of People's Republic of China, Second Office Action in Patent Application No. 202011350031.1 issued on Oct. 8, 2022, which is a foreign counterpart application corresponding to this U.S. Patent Application, to which this application claims priority.

* cited by examiner

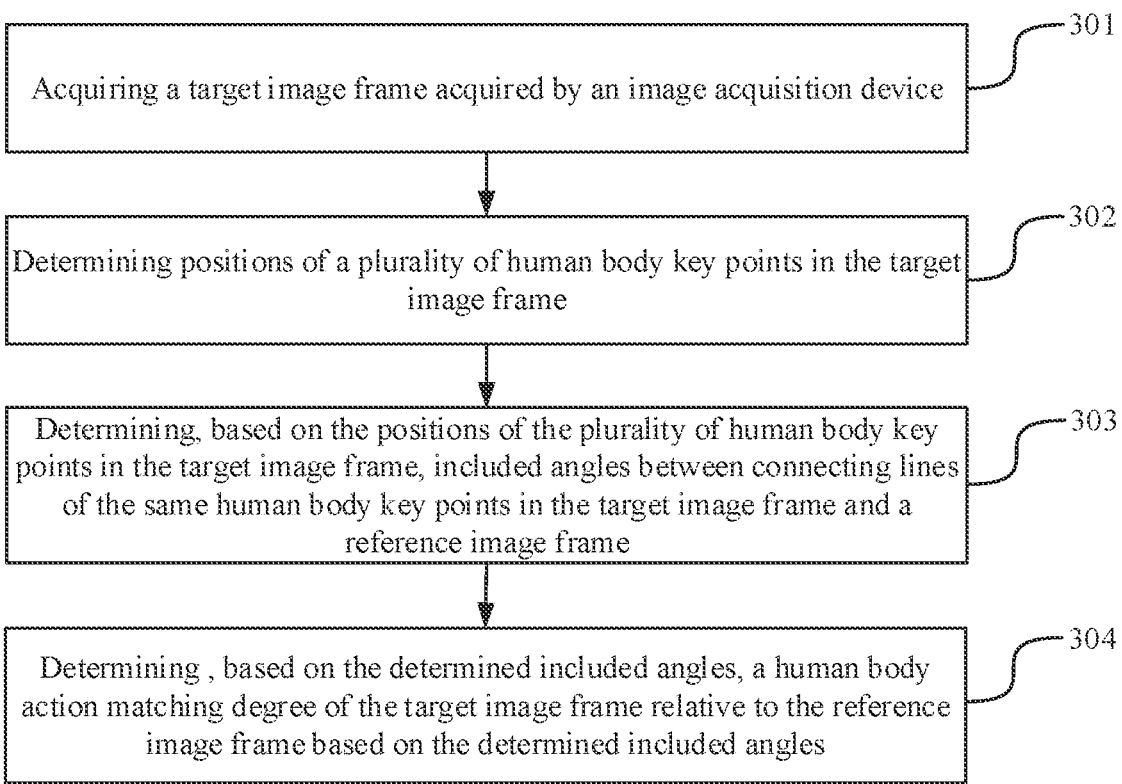

301

Acquiring a target image frame acquired by an image acquisition device

302

Determining positions of a plurality of human body key points in the target image frame

303

Determining, based on the positions of the plurality of human body key points in the target image frame, included angles between connecting lines of the same human body key points in the target image frame and a reference image frame

304

Determining , based on the determined included angles, a human body action matching degree of the target image frame relative to the reference image frame based on the determined included angles

VIDEO CLASSIFICATION METHOD AND APPARATUS

CROSS-REFERENCE TO RELATED APPLICATION

The present disclosure is a U.S. national phase application based on PCT/CN2021/125750, filed on Oct. 22, 2021, which claims priority to Chinese Patent Application No. 202011350031.1, filed on Nov. 26, 2020 and entitled "METHOD AND APPARATUS FOR CLASSIFYING VIDEOS", all of which are hereby incorporated herein by reference in their entireties for all purposes.

TECHNICAL FIELD

The present disclosure relates to the technical field of data processing, in particular, relates to a method and an apparatus for classifying videos.

BACKGROUND

With the development of the economy, there are more and more ways for people to have leisure and entertainment. Singing and dancing have become one of the ways of entertainment, and more and more people make a recording while singing and dancing.

SUMMARY

Embodiments of the present disclosure provide a method for classifying videos.

In a first aspect, a method for classifying videos is provided. The method includes:

acquiring a target audio and a corresponding target video including human body actions;

determining, based on a human body action matching degree of each target image frame in the target video relative to a corresponding reference image frame in a reference video, a total human body action matching degree score of the target video relative to the reference video;

determining, based on an audio matching degree of each target audio segment in the target audio relative to a corresponding reference audio segment in a reference audio of the reference video, a total audio matching degree score of the target audio relative to the reference audio; and determining, based on the total human body action matching degree score and the total audio matching degree score, a comprehensive classification result.

In some embodiments, the method further includes:

determining a human body action matching degree score corresponding to a human body action matching degree of the target image frame relative to the reference image frame, and determining an audio matching degree score corresponding to an audio matching degree of the target audio segment relative to the reference audio segment; and displaying a human body action matching degree score curve based on the human body action matching degree score corresponding to each target image frame, and displaying an audio matching degree score curve based on the audio matching degree score corresponding to each target audio segment.

2

In some embodiments, the method further includes:

displaying a time axis corresponding to the target video and the target audio;

determining, in response to receiving an instruction of selecting a target time point on the time axis, a target image frame and a target audio segment corresponding to the target time point; and displaying a human body action matching degree score of the target image frame corresponding to the target time point and an audio matching degree score of the target audio segment corresponding to the target time point.

In some embodiments, the method further includes:

determining, based on the human body action matching degree of the target image frame relative to the reference image frame, a corresponding human body action matching degree score; and adding the human body action matching degree score to a position, corresponding to the target image frame, in the target video in a form of an image.

In some embodiments, the method further includes:

determining, based on the audio matching degree of the target audio segment relative to the reference audio segment, a corresponding audio matching degree score; and adding the audio matching degree score to a position, corresponding to the target audio segment, in the target video in a form of an image.

In some embodiments, prior to determining, based on the human body action matching degree of each target image frame in the target video relative to the corresponding reference image frame in the reference video, the total human body action matching degree score of the target video relative to the reference video, the method further includes:

acquiring the target image frames from the target video at a preset first time interval; determining, in response to acquiring every target image frame, positions of a plurality of human body key points in the target image frame; determining, based on the positions of the plurality of human body key points in the target image frame, included angles between connecting lines of the same human body key points in the target image frame and the reference image frame; and determining, based on the determined included angles, a human body action matching degree of the target image frame relative to the reference image frame.

In some embodiments, the plurality of human body key points include a preset reference human body key point and non-reference human body key points, and determining, based on the positions of the plurality of human body key points in the target image frame, the included angles between connecting lines of the same human body key points in the target image frame and the reference image frame includes:

for each of the non-reference human body key points, in the target image frame, determining a first connecting line of the non-reference human body key point and the reference human body key point based on the position of the non-reference human body key point and the position of the reference human body key point; acquiring a second connecting line of the non-reference human body key point and the reference human body key point in the reference image frame; and determining an included angle between the first connecting line and the second connecting line.

In some embodiments, upon acquiring the target image frames from the target video at the preset first time interval, the method further includes:

acquiring reference image frames, with the same playing time points as the target image frames in the target video; or, acquiring reference image frames played at acquisition time points of the target image frames.

In some embodiments, determining, based on the determined included angles, the human body action matching degree of the target image frame relative to the reference image frame includes:

acquiring a processing result value corresponding to each included angle by processing each of the determined included angles based on a preset function; and determining the human body action matching degree of the target image frame relative to the reference image frame based on the processing result value corresponding to each included angle.

In some embodiments, prior to determining, based on the audio matching degree of each target audio segment in the target audio relative to the corresponding reference audio segment in the reference audio of the reference video, the total audio matching degree score of the target audio relative to the reference audio, the method further includes:

acquiring the target audio segments in the target audio one by one; determining, in response to acquiring every target audio segment, a fundamental frequency similarity of the target audio segment relative to the corresponding reference audio segment in the reference audio; and determining, based on the fundamental frequency similarity of the target audio segment relative to the corresponding reference audio segment in the reference audio, an audio matching degree of the target audio segment relative to the corresponding reference audio segment.

In some embodiments, determining the fundamental frequency similarity of the target audio segment relative to the corresponding reference audio segment in the reference audio includes:

determining the reference audio segment, corresponding to the target audio segment, in the reference audio; and determining a difference value between the fundamental frequency of each target audio frame in the target audio segment and the fundamental frequency of the corresponding reference audio frame in the reference audio segment, and determining a proportion of the number of target audio frames with corresponding difference values being within a preset range to the total number of frames of the target audio segment as the fundamental frequency similarity of the target audio segment relative to the corresponding reference audio segment in the reference audio.

In some embodiments, the method further includes:

determining a text similarity of the target audio segment relative to the corresponding reference audio segment in the reference audio, wherein determining, based on the fundamental frequency similarity of the target audio segment relative to the corresponding reference audio segment in the reference audio, the audio matching degree of the target audio segment relative to the corresponding reference audio segment includes:

determining, based on the fundamental frequency similarity and the text similarity of the target audio segment relative to the corresponding reference audio segment in the reference audio, the audio matching degree of the target audio segment relative to the corresponding reference audio segment. In some embodiments, determining the text similarity of the target audio segment relative to the corresponding reference audio segment in the reference audio includes:

acquiring a target recognition text by performing text recognition on the target audio segment;

determining the reference audio segment, corresponding to the target audio segment, in the reference audio, and acquiring a reference recognition text corresponding to the reference audio segment; and taking a similarity between the target recognition text and the reference recognition text as the text similarity of the target audio segment relative to the corresponding reference audio segment in the reference audio.

In a second aspect, an apparatus for classifying videos is provided. The apparatus includes:

an acquiring module, configured to acquire a target audio and a corresponding target video including human body actions;

a video determining module, configured to determine, based on a human body action matching degree of each target image frame in the target video relative to a corresponding reference image frame in a reference video, a total human body action matching degree score of the target video relative to the reference video;

an audio determining module, configured to determine, based on an audio matching degree of each target audio segment in the target audio relative to a corresponding reference audio segment in a reference audio of the reference video, a total audio matching degree score of the target audio relative to the reference audio; and a comprehensive determining module, configured to determine, based on the total human body action matching degree score and the total audio matching degree score, a comprehensive classification result.

In some embodiments, the apparatus further includes:

a first determining module, configured to determine a human body action matching degree score corresponding to a human body action matching degree of the target image frame relative to the reference image frame, and determine an audio matching degree score corresponding to an audio matching degree of the target audio segment relative to the reference audio segment; and a first displaying module, configured to display a human body action matching degree score curve based on the human body action matching degree score corresponding to each target image frame, and display an audio matching degree score curve based on the audio matching degree score corresponding to each target audio segment.

In some embodiments, the apparatus further includes:

a second displaying module, configured to display a time axis corresponding to the target video and the target audio;

determine, in response to receiving an instruction of selecting a target time point on the time axis, a target image frame and a target audio segment corresponding to the target time point; and display a human body action matching degree score of the target image frame corresponding to the target time point and an audio matching degree score of the target audio segment corresponding to the target time point.

In some embodiments, the apparatus further includes:

a first determining module, configured to determine, based on the human body action matching degree of the target image frame relative to the reference image frame, a corresponding human body action matching degree score; and a first adding module, configured to add the human body action matching degree score to a position, corresponding to the target image frame, in the target video in a form of an image.

In some embodiments, the apparatus further includes:

a first determining module, configured to determine, based on the audio matching degree of the target audio segment relative to the reference audio segment, a corresponding audio matching degree score; and a second adding module, configured to add the audio matching degree score to a position, corresponding to the target audio segment, in the target video in a form of an image.

In some embodiments, the first determining module is further configured to:

acquire the target image frames from the target video at a preset first time interval; determine, in response to acquiring every target image frame, positions of a plurality of human body key points in the target image frame; determine, based on the positions of the plurality of human body key points in the target image frame, included angles between connecting lines of the same human body key points in the target image frame and the reference image frame; and determine, based on the determined included angles, a human body action matching degree of the target image frame relative to the reference image frame.

In some embodiments, the plurality of human body key points include a preset reference human body key point and non-reference human body key points, and the first determining module is configured to:

for each of the non-reference human body key points, in the target image frame, determine a first connecting line of the non-reference human body key point and the reference human body key point based on the position of the non-reference human body key point and the position of the reference human body key point; acquire a second connecting line of the non-reference human body key point and the reference human body key point in the reference image frame; and determine an included angle between the first connecting line and the second connecting line.

In some embodiments, the first determining module is further configured to:

acquire reference image frames, with the same playing time points as the target image frames in the target video, in the reference video; or, acquire reference image frames played at acquisition time points of the target image frames.

In some embodiments, the first determining module is further configured to:

acquire a processing result value corresponding to each included angle by processing each of the determined included angles based on a preset function; and determine the human body action matching degree of the target image frame relative to the reference image frame based on the processing result value corresponding to each included angle.

In some embodiments, the first determining module is further configured to:

acquire the target audio segments in the target audio one by one; determine, in response to acquiring every target audio segment, a fundamental frequency similarity of the target audio segment relative to the corresponding reference audio segment in the reference audio; and determine, based on the fundamental frequency similarity of the target audio segment relative to the corresponding reference audio segment in the reference audio, an audio matching degree of the target audio segment relative to the corresponding reference audio segment.

In some embodiments, the first determining module is configured to:

determine the reference audio segment, corresponding to the target audio segment, in the reference audio; and determine a difference value between the fundamental frequency of each target audio frame in the target audio segment and the fundamental frequency of the corresponding reference audio frame in the reference audio segment, and determine a proportion of the number of target audio frames with corresponding difference values being within a preset range to the total number of frames of the target audio segment as the fundamental frequency similarity of the target audio segment relative to the corresponding reference audio segment in the reference audio.

In some embodiments, the first determining module is further configured to:

determine a text similarity of the target audio segment relative to the corresponding reference audio segment in the reference audio, wherein determining, based on the fundamental frequency similarity of the target audio segment relative to the corresponding reference audio segment in the reference audio, the audio matching degree of the target audio segment relative to the corresponding reference audio segment includes:

determining, based on the fundamental frequency similarity and the text similarity of the target audio segment relative to the corresponding reference audio segment in the reference audio, the audio matching degree of the target audio segment relative to the corresponding reference audio segment.

In some embodiments, the first determining module is configured to:

acquire a target recognition text by performing text recognition on the target audio segment;

determine the reference audio segment, corresponding to the target audio segment, in the reference audio, and acquire a reference recognition text corresponding to the reference audio segment; and take a similarity between the target recognition text and the reference recognition text as the text similarity of the target audio segment relative to the corresponding reference audio segment in the reference audio.

In a third aspect, a method for classifying videos is provided. The method includes:

acquiring a target audio and a corresponding target video including human body actions;

determining, based on a human body action matching degree of each target image frame in the target video relative to a corresponding reference image frame in a reference video, a total human body action matching degree score of the target video relative to the reference video;

determining, based on an audio matching degree of each target audio segment in the target audio relative to a corresponding reference audio segment in a reference audio, a total audio matching degree score of the target audio relative to the reference audio, wherein the reference audio is an audio corresponding to the reference video; and determining, based on the total human body action matching degree score and the total audio matching degree score, a comprehensive classification result.

In some embodiments, the method further includes:

determining a human body action matching degree score corresponding to a human body action matching degree of the target image frame relative to the reference image frame, and determining an audio matching degree score corresponding to an audio matching degree of the target audio segment relative to the reference audio segment; and displaying a human body action matching degree score curve based on the human body action matching degree score corresponding to each target image frame, and displaying an audio matching degree score curve based on the audio matching degree score corresponding to each target audio segment.

In some embodiments, the method further includes:

displaying a time axis corresponding to the target video and the target audio;

determining, in response to receiving an instruction of selecting a target time point on the time axis, a target image frame and a target audio segment corresponding to the target time point; and displaying a human body action matching degree score of the target image frame corresponding to the target time point and an audio matching degree score of the target audio segment corresponding to the target time point.

In some embodiments, the method further includes:

determining, based on the human body action matching degree of the target image frame relative to the reference image frame, a human body action matching degree score corresponding to the target image frame; and adding the human body action matching degree score to a position, corresponding to the target image frame, in the target video in a form of an image.

In some embodiments, the method further includes:

determining, based on the audio matching degree of the target audio segment relative to the reference audio segment, an audio matching degree score corresponding to the target audio segment; and adding the audio matching degree score to a position, corresponding to the target audio segment, in the target video in a form of an image.

In some embodiments, prior to determining, based on the human body action matching degree of each target image frame in the target video relative to the corresponding reference image frame in the reference video, the total human body action matching degree score of the target video relative to the reference video, the method further includes:

acquiring the target image frames from the target video at a preset first time interval; determining, in response to acquiring every target image frame, positions of a plurality of human body key points in the target image frame; determining, based on the positions of the plurality of human body key points in the target image frame, included angles between connecting lines of the same human body key points in the target image frame and the reference image frame; and determining, based on the determined included angles, the human body action matching degree of the target image frame relative to the reference image frame.

In some embodiments, the plurality of human body key points include a preset reference human body key point and non-reference human body key points, and determining, based on the positions of the plurality of human body key points in the target image frame, the included angles between connecting lines of the same human body key points in the target image frame and the reference image frame includes:

for each of the non-reference human body key points, in the target image frame, determining a first connecting line of the non-reference human body key point and the reference human body key point based on the position of the non-reference human body key point and the position of the reference human body key point; acquiring a second connecting line of the non-reference human body key point and the reference human body key point in the reference image frame; and determining an included angle between the first connecting line and the second connecting line.

In some embodiments, upon acquiring the target image frames from the target video at the preset first time interval, the method further includes:

acquiring reference image frames, with the same playing time points as the target image frames in the target video, in the reference video; or, acquiring reference image frames played at acquisition time points of the target image frames.

In some embodiments, determining, based on the determined included angles, the human body action matching degree of the target image frame relative to the reference image frame includes:

acquiring a processing result value corresponding to each included angle by processing each of the determined included angles based on a preset function; and determining the human body action matching degree of the target image frame relative to the reference image frame based on the processing result value corresponding to each included angle.

In some embodiments, prior to determining, based on the audio matching degree of each target audio segment in the target audio relative to the corresponding reference audio segment in the reference audio, the total audio matching degree score of the target audio relative to the reference audio, the method further includes:

acquiring the target audio segments in the target audio one by one; determining, in response to acquiring every target audio segment, a fundamental frequency similarity of the target audio segment relative to the corresponding reference audio segment in the reference audio; and determining, based on the fundamental frequency similarity of the target audio segment relative to the corresponding reference audio segment in the reference audio, an audio matching degree of the target audio segment relative to the corresponding reference audio segment.

In some embodiments, determining the fundamental frequency similarity of the target audio segment relative to the corresponding reference audio segment in the reference audio includes:

determining the reference audio segment, corresponding to the target audio segment, in the reference audio; and determining a difference value between the fundamental frequency of each target audio frame in the target audio segment and the fundamental frequency of the corresponding reference audio frame in the reference audio segment, and determining a proportion of the number of target audio frames with corresponding difference values being within a preset range to the total number of frames of the target audio segment as the fundamental frequency similarity of the target audio segment relative to the corresponding reference audio segment in the reference audio.

In some embodiments, the method further includes:

determining a text similarity of the target audio segment relative to the corresponding reference audio segment in the reference audio, wherein determining, based on the fundamental frequency similarity of the target audio segment relative to the corresponding reference audio segment in the reference audio, the audio matching degree of the target audio segment relative to the corresponding reference audio segment includes:

determining, based on the fundamental frequency similarity and the text similarity of the target audio segment relative to the corresponding reference audio segment in the reference audio, the audio matching degree of the target audio segment relative to the corresponding reference audio segment.

In some embodiments, determining the text similarity of the target audio segment relative to the corresponding reference audio segment in the reference audio includes:

acquiring a target recognition text by performing text recognition on the target audio segment;

determining the reference audio segment, corresponding to the target audio segment, in the reference audio, and acquiring a reference recognition text corresponding to the reference audio segment; and taking a similarity between the target recognition text and the reference recognition text as the text similarity of the target audio segment relative to the corresponding reference audio segment in the reference audio.

In a fourth aspect, an apparatus for classifying videos is provided. The apparatus includes:

an acquiring module, configured to acquire a target audio and a corresponding target video including human body actions;

a video determining module, configured to determine, based on a human body action matching degree of each target image frame in the target video relative to a corresponding reference image frame in a reference video, a total human body action matching degree score of the target video relative to the reference video;

an audio determining module, configured to determine, based on an audio matching degree of each target audio segment in the target audio relative to a corresponding reference audio segment in a reference audio, a total audio matching degree score of the target audio relative to the reference audio, wherein the reference audio is an audio corresponding to the reference video; and a comprehensive determining module, configured to determine, based on the total human body action matching degree score and the total audio matching degree score, a comprehensive classification result.

In some embodiments, the apparatus further includes:

a first determining module, configured to determine a human body action matching degree score corresponding to a human body action matching degree of the target image frame relative to the reference image frame, and determine an audio matching degree score corresponding to an audio matching degree of the target audio segment relative to the reference audio segment; and a first displaying module, configured to display a human body action matching degree score curve based on the human body action matching degree score corresponding to each target image frame, and display an audio matching degree score curve based on the audio matching degree score corresponding to each target audio segment.

In some embodiments, the apparatus further includes:

a second displaying module, configured to display a time axis corresponding to the target video and the target audio;

determine, in response to receiving an instruction of selecting a target time point on the time axis, a target image frame and a target audio segment corresponding to the target time point; and display a human body action matching degree score of the target image frame corresponding to the target time point and an audio matching degree score of the target audio segment corresponding to the target time point.

In some embodiments, the apparatus further includes:

a first determining module, configured to determine, based on the human body action matching degree of the target image frame relative to the reference image frame, a human body action matching degree score corresponding to the target image frame; and a first adding module, configured to add the human body action matching degree score to a position, corresponding to the target image frame, in the target video in a form of an image.

In some embodiments, the apparatus further includes:

a first determining module, configured to determine, based on the audio matching degree of the target audio segment relative to the reference audio segment, an audio matching degree score corresponding to the target audio segment; and a second adding module, configured to add the audio matching degree score to a position, corresponding to the target audio segment, in the target video in a form of an image.

In some embodiments, the first determining module is further configured to:

acquire the target image frames from the target video at a preset first time interval; determine, in response to acquiring every target image frame, positions of a plurality of human body key points in the target image frame; determine, based on the positions of the plurality of human body key points in the target image frame, included angles between connecting lines of the same human body key points in the target image frame and the reference image frame; and determine, based on the determined included angles, the human body action matching degree of the target image frame relative to the reference image frame.

In some embodiments, the plurality of human body key points include a preset reference human body key point and non-reference human body key points, and the first determining module is configured to:

for each of the non-reference human body key points, in the target image frame, determine a first connecting line of the non-reference human body key point and the reference human body key point based on the position of the non-reference human body key point and the position of the reference human body key point; acquire a second connecting line of the non-reference human body key point and the reference human body key point in the reference image frame; and determine an included angle between the first connecting line and the second connecting line.

In some embodiments, the first determining module is further configured to:

acquire reference image frames, with the same playing time points as the target image frames in the target video, in the reference video; or, acquire reference image frames played at acquisition time points of the target image frames.

In some embodiments, the first determining module is further configured to:

acquire a processing result value corresponding to each included angle by processing each of the determined included angles based on a preset function; and determine the human body action matching degree of the target image frame relative to the reference image frame based on the processing result value corresponding to each included angle.

In some embodiments, the first determining module is further configured to:

acquire the target audio segments in the target audio one by one; determine, in response to acquiring every target audio segment, a fundamental frequency similarity of the target audio segment relative to the corresponding reference audio segment in the reference audio; and determine, based on the fundamental frequency similarity of the target audio segment relative to the corresponding reference audio segment in the reference audio, an audio matching degree of the target audio segment relative to the corresponding reference audio segment.

In some embodiments, the first determining module is configured to:

determine the reference audio segment, corresponding to the target audio segment, in the reference audio; and determine a difference value between the fundamental frequency of each target audio frame in the target audio segment and the fundamental frequency of the corresponding reference audio frame in the reference audio segment, and determine a proportion of the number of target audio frames with corresponding difference values being within a preset range to the total number of frames of the target audio segment as the fundamental frequency similarity of the target audio segment relative to the corresponding reference audio segment in the reference audio.

In some embodiments, the first determining module is further configured to:

determine a text similarity of the target audio segment relative to the corresponding reference audio segment in the reference audio, wherein determining, based on the fundamental frequency similarity of the target audio segment relative to the corresponding reference audio segment in the reference audio, the audio matching degree of the target audio segment relative to the corresponding reference audio segment includes:

determining, based on the fundamental frequency similarity and the text similarity of the target audio segment relative to the corresponding reference audio segment in the reference audio, the audio matching degree of the target audio segment relative to the corresponding reference audio segment.

In some embodiments, the first determining module is configured to:

acquire a target recognition text by performing text recognition on the target audio segment;

determine the reference audio segment, corresponding to the target audio segment, in the reference audio, and acquire a reference recognition text corresponding to the reference audio segment; and take a similarity between the target recognition text and the reference recognition text as the text similarity of the target audio segment relative to the corresponding reference audio segment in the reference audio.

In a fifth aspect, a computer device is provided. The computer device includes a processor and a memory for storing at least one instruction, wherein the at least one instruction, when loaded and executed by the processor, causes the processor to perform the method for classifying videos.

In a sixth aspect, a computer-readable storage medium storing at least one instruction therein is provided, wherein the at least one instruction, when loaded and executed by a processor, causes the processor to perform the method for classifying videos.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 3 is a flowchart of a method for determining a human body action matching degree according to some embodiments of the present disclosure;

DETAILED DESCRIPTION

Figure 1:
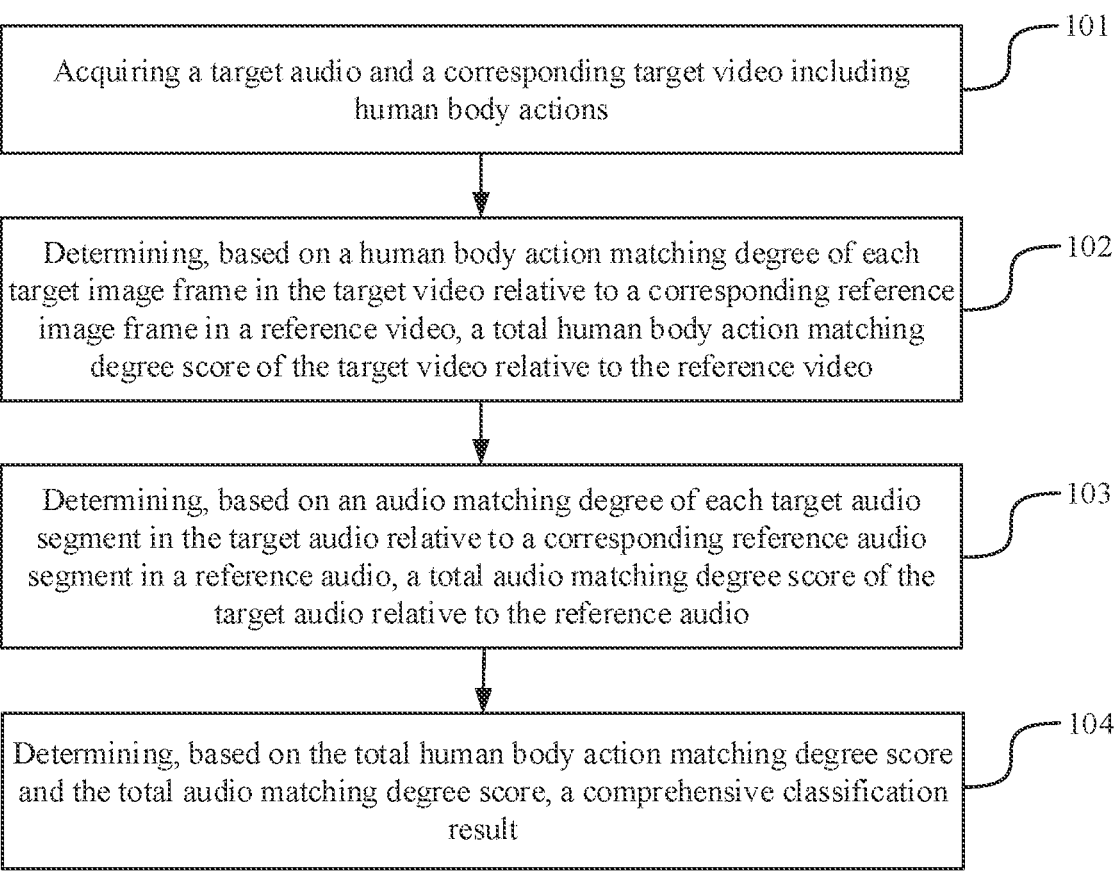
FIG. 1 is a flowchart of a method for classifying videos according to some embodiments of the present disclosure.

For clearer descriptions of the objectives, technical solutions, and advantages of the present disclosure, embodiments of the present disclosure are further described in detail below with reference to the accompanying drawings.

In some applications, while playing a video and an accompaniment, a user may imitate actions of a character in the video and sing, and at the same time, make an audio/video recording of himself. During use of the above functions of the application, there is a lack of a way to classify the imitation of a singing and dancing video.

The embodiments of the present disclosure provide a method for classifying videos. The method is implemented by a computer device. The computer device is a terminal, a server, and the like. The terminal is a desktop computer, a notebook computer, a tablet computer, a mobile phone, and the like. The server is a single server or a server cluster.

The computer device includes a processor, a memory, input components, output components, communication components, and the like. The memory is various non-volatile memory devices or volatile memory devices and is configured to store data, for example, data of an application with video shooting and evaluation functions, data pre-stored for determining a matching degree and displaying a score, data generated when a user records a video and an audio, intermediate data generated during a process of determining the matching degree, and the like. The processor is configured to run the application with the video shooting and evaluation functions, to process the video and audio recorded by the user, and so on. The input components include a mouse, a keyboard, a touch pad, a handwriting pad, a microphone, and the like, and are used for acquiring data input by the user. The output components include an image output component, an audio output component, a vibration output component, and the like. The image output component is configured to display an interface of the application with the video shooting and evaluation functions to facilitate user operation, display a reference video and a target video, and also display a result of a matching degree score. The audio output component is configured to play the reference audio and the audio recorded by the user. The vibration output component is configured to output some prompt signals. In addition, the computer device is connected to an image acquisition device, such as a camera, which is used for video shooting. The image acquisition device is an independent device or a kit of the computer device.

The computer device is provided with an application with the video shooting and evaluation functions, such as a short video application, a live streaming application, and a kara-oke application. The application is used by the user to imitate videos, audios, and the like, and displays the comple-tion condition of the imitation of the user, that is, a score. In the embodiments of the present disclosure, the solutions are described by taking an example that the user imitates an audio/video on a terminal by using an application with video shooting and evaluation functions. Other cases are similar and will thus not be repeated in the embodiments.

It is to be noted that the video in the present disclosure refers to a video having no audio portion but only an image portion.

FIG. 1 is a flowchart of a method for classifying videos according to some embodiments of the present disclosure. The method can solve the problem that there is a lack of a way to classify the imitation of a singing and dancing video in the related art. Referring to FIG. 1, the method includes the following processes.

In 101, a target audio and a corresponding target video including human body actions are acquired.

The target audio is an audio in an audio/video recorded by a user, for example, the target audio is a singing audio in a singing and dancing audio/video recorded by the user. The target video is a video in the audio/video recorded by the user, for example, the target video is a dancing video in the singing and dancing audio/video recorded by the user.

In the implementation, the user clicks on a terminal to run an application with video shooting and evaluation functions, so as to record an audio/video which the user wants to imitate on the application, and then a computer device acquires the audio/video recorded by the user and acquires the target audio and the target video included in the audio/ video. The time node for executing step 101 has various possibilities. A complete target audio and a complete target video are acquired upon completing the audio/video record-ing and entering a completion interface, or a target audio and a target video that are recorded before are selected from an interface of "My works".

In 102, based on a human body action matching degree of each target image frame in the target video relative to a corresponding reference image frame in a reference video, a total human body action matching degree score of the target video relative to the reference video is determined.

The reference video is a video in a reference audio/video imitated by the user, for example, the reference video is a video in a music video (MV) imitated by the user.

In the implementation, a technician presets a time interval between two adjacent target image frames. In the recording process, the computer device periodically acquires the target image frames and the corresponding reference image frames. Specifically, in the recording process of the target audio/video, the computer device periodically acquires an image frame in the target video and an image frame, corresponding to the image frame, in the reference video based on the preset time interval, and the two image frames are determined as the target image frame and the corre-sponding reference image frame respectively. Then, the target image frame and the reference image frame are processed to calculate the human body action matching degree (a calculation method of the human body action matching degree will be described in detail hereinafter, and will not be repeated here) of the target image frame and the corresponding reference image frame.

Upon determining the human body action matching degree of each target image frame in the target video relative to the reference image frame, a human body action matching degree score corresponding to the human body action matching degree is determined based on each human body action matching degree and an algorithm preset by the technician. For example, in the case that the human body action matching degree is 0.8, the human body action matching degree score is set to 100 times of the human body action matching degree, that is, 80 points. Then, the obtained human body action matching degree score is stored to a preset position. Upon acquiring the next target image frame, the human body action matching degree score of the next target image frame and the corresponding reference image frame is calculated and then stored until the user finishes recording.

Upon calculating each human body action matching degree score based on the human body action matching degrees of the target video, a total score of the target video relative to the reference video, that is, the total human body action matching degree score, is calculated. Upon finishing recording by the user, a completion interface is triggered to be displayed. In this case, the human body action matching degree score corresponding to each target image frame calculated and stored in the recording process is called, and then the total human body action matching degree score is calculated and displayed in the completion interface. The total human body action matching degree score is calculated through various calculation methods. The total human body action matching degree score is an average value of the human body action matching degree scores of the target image frames in the target video, or is a median value of the human body action matching degree scores of the target image frames in the target video, or is an average value of the remaining human body action matching degree scores upon removal of a lowest value and a highest value, and the like. The total human body action matching degree score is calculated by selecting any one of the above calculation methods, or selecting other calculation methods, which are not limited in the present disclosure.

In 103, based on an audio matching degree of each target audio segment in the target audio relative to a corresponding reference audio segment in a reference audio, a total audio matching degree score of the target audio relative to the reference audio is determined.

The reference audio is an audio corresponding to the reference video, and is an audio in the reference audio/video imitated by the user, for example, the reference audio is an audio in the music video (MV) imitated by the user.

In the implementation, the technician presets a duration of the target audio segment. In the recording process, the computer device periodically acquires the target audio segment and the corresponding reference audio segment. Specifically, the computer device acquires the target audio segment and the corresponding reference audio segment according to the preset duration of the target audio segment. Then, the target audio segment and the corresponding reference audio segment are processed to calculate a matching degree between the target audio segment and the corresponding reference audio segment, that is, the audio matching degree (a calculation method of the audio matching degree will be described in detail hereinafter, and will not be repeated here). Upon determining the audio matching degree of each target audio segment in the target audio relative to the reference audio segment, the audio matching degree score corresponding to the audio matching degree is determined based on each audio matching degree and an algorithm preset by the technician. For example, in the case that the audio matching degree is 0.5, the audio matching degree score is set to 100 times of the audio matching degree, that is, 50 points. Then, the obtained audio matching degree score is stored to a preset position. Upon acquiring the next target audio segment, the audio matching degree score of the next target audio segment and the corresponding reference audio segment is calculated and then stored until the user finishes recording.

Upon calculating each audio matching degree score based on the audio matching degrees in the target audio, a total score of the target audio relative to the reference audio, that is, the total audio matching degree score, is calculated. Upon finishing recording by the user and displaying the completion interface, the audio matching degree score corresponding to each target audio segment calculated and stored in the recording process is called, and then the total audio matching degree score is calculated and displayed in the completion interface. The total audio matching degree score is calculated through various calculation methods. The total audio matching degree score is an average value of the audio matching degree scores of the target audio segments in the target audio, or is a median value of the audio matching degree scores of the target audio segments in the target audio, or is an average value of the remaining audio matching degree scores upon removal of a lowest value and a highest value, and the like. The total audio matching degree score is calculated by selecting any one of the above calculation methods, or selecting other calculation methods, which are not limited by the present disclosure.

In 104, based on the total human body action matching degree score and the total audio matching degree score, a comprehensive classification result is determined.

The comprehensive classification result is considered as a comprehensive score or a comprehensive rating of human body actions and audios in the audio/video recorded by the user.

In the implementation, upon determining the total human body action matching degree score and the total audio matching degree score, the total human body action matching degree score and the total audio matching degree score are weighted based on a weighted value preset by the technician, such that a comprehensive score or a comprehensive rating of the target video and the target audio imitated by the user is obtained and then displayed in the completion interface. In the case that the comprehensive classification result is a comprehensive score, the comprehensive score is obtained by weighting the total human body action matching degree score and the total audio matching degree score. In the case that the comprehensive classification result is a comprehensive rating, the technician needs to classify the comprehensive classification result in advance, and the comprehensive rating is determined according to a classification situation upon calculating the comprehensive score. For example, the technician classifies the comprehensive classification result into five categories: B, A, S, SS, and SSS, which correspond to the comprehensive scores of 0-20, 21-40, 41-60, 61-80, and 81-100, respectively. In the case that the total human body action matching degree score is 80 points, the total audio matching degree score is 60 points, a video weight is 0.6, and an audio weight is 0.4, the comprehensive score is calculated as 80×0.6+60×0.4=72 points, and the comprehensive rating is correspondingly SS.

In some embodiments, a score of each part of the recorded audio and video is calculated and presented in the format of a curve for subsequent review by the user. The corresponding process is as follows:

a human body action matching degree score corresponding to the human body action matching degree of the target image frame relative to the reference image frame is determined, and an audio matching degree score corresponding to the audio matching degree of the target audio segment relative to the reference audio segment is determined; and a human body action matching degree score curve is displayed based on the human body action matching degree score corresponding to each target image frame, and an audio matching degree score curve is displayed based on the audio matching degree score corresponding to each target audio segment.

Figure 2:
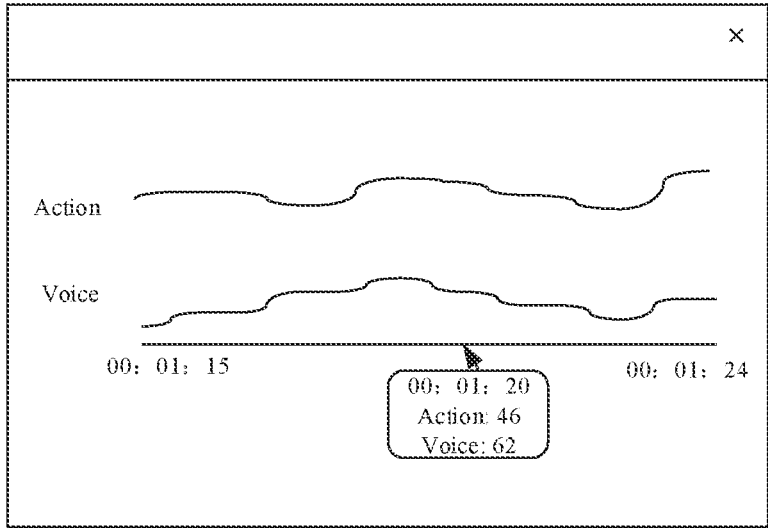
FIG. 2 is a schematic display view of a scoring window according to some embodiments of the present disclosure.

In the implementation, the completion interface further has a "generate" button besides the function of displaying the total human body action matching degree score, the total audio matching degree score, and the comprehensive classification result. The user clicks the "generate" button to trigger the synthesis of the target audio, the target video, and an accompaniment to obtain a synthesized audio/video. Then, a release interface with a "release" button is triggered to be displayed. By clicking the "release" button, the calculated human body action matching degree scores, the audio matching degree scores, the total human body action matching degree score, the total audio matching degree score, the comprehensive classification result, and the synthesized audio/video are triggered to be stored into a server. The user clicks the icon of the imitated audio/video in an interface of "My works" to trigger displaying of a work interface of the audio/video, and then views the score and the synthesized audio/video. The process is specifically as follows:

audio/video options and scoring options are arranged in the interface of "My works"; the synthesized audio/video stored in the server is triggered to be called by clicking the audio/video options, and then the audio/video synthesized by the target audio and target video recorded by the user and the accompaniment is played; the scores stored in the server are triggered to be called by clicking the scoring options, a scoring interface is displayed, wherein the total human body action matching degree score, the total audio matching degree score, the comprehensive classification results, and abbreviated icons of each sentence of audio texts are displayed; and a scoring window is triggered to be displayed by clicking the abbreviated icon of any one sentence of the audio texts, wherein a human body action matching degree score curve and an audio matching degree score curve drawn by human body action matching degree scores and audio matching degree scores of a period of time corresponding to the abbreviation of the sentence of audio text are displayed in the scoring window. For example, FIG. 2 shows a score of an audio/video segment from 1 minute 15 seconds to 1 minute 24 seconds, wherein a curve corresponding to actions is the human body action matching degree score curve, and a curve corresponding to voice is the audio matching degree score curve.

In some embodiments, a time axis corresponding to the human body action matching degree score curve and the audio matching degree score curve is correspondingly displayed in the scoring interface, such that the user views the score based on a time point. The corresponding process is as follows:

a time axis corresponding to the target video and the target audio is displayed; in the case of receiving an instruction of selecting a target time point on the time axis, a target image frame and a target audio segment corresponding to the target time point are determined; and the human body action matching degree score of the target image frame corresponding to the target time point and the audio matching degree score of the target audio segment corresponding to the target time point are displayed.

In the implementation, in the scoring window, a corresponding time axis is displayed at a corresponding position of the human body action matching degree score curve and the audio matching degree score curve. In the case that the user wants to view a human body action matching degree score and an audio matching degree score at a certain time point, the user places a mouse at the time point of the time axis to trigger displaying of a zoom-in window, and the human body action matching degree score of the target image frame corresponding to the time point and the audio matching degree score of the target audio segment corresponding to the time point are displayed in the zoom-in window. In the case that the user moves the mouse away from the position corresponding to the target time point, the zoom-in window is triggered to be closed. For example, FIG. 2 shows the time axis from 1 minute 15 seconds to 1 minute 24 seconds, the mouse is located at a position of 1 minute 20 seconds of the time axis, and a human body action matching degree score and an audio matching degree score corresponding to 1 minute 20 seconds are displayed in a zoom-in window below the mouse.

In some embodiments, the score of each part of the audio and the video is merged into the target video in the form of an image to generate a new video, wherein the corresponding score is displayed. The corresponding process is as follows:

based on the human body action matching degree of the target image frame relative to the reference image frame, the human body action matching degree score corresponding to the target image frame is determined;

and the human body action matching degree score is added to a position, corresponding to the target image frame, in the target video in the form of an image.

Based on the audio matching degree of the target audio segment relative to the reference audio segment, the audio matching degree score corresponding to the target audio segment is determined; and the audio matching degree score is added to a position, corresponding to the target audio segment, in the target video in the form of an image.

The user clicks the "generate" button in the completion interface to trigger modification of pixels of corresponding positions of all image frames in the target video, such that the total human body action matching degree score, the total audio matching degree score, and the comprehensive classification result are displayed at the positions; or, pixels of corresponding positions of each target image frame and image frames adjacent thereto within a continuous preset time interval are modified, such that the human body action matching degree scores corresponding to the target image frames are displayed at the positions; or, pixels of corresponding positions of image frames of a period of time corresponding to each target audio segment are modified, such that the audio matching degree scores corresponding to the target audio frames are displayed at the positions; or, pixels of corresponding positions of image frames of a period of time corresponding to a plurality of target audio segments within a preset time interval are modified, such that an average value of the audio matching degree scores corresponding to the plurality of target audio segments is displayed at the positions. Therefore, various scores are incorporated into the target video in the form of images.

Then, the video added with the scores is synthesized with the target audio and the accompaniment to generate the synthesized audio/video, then the release interface is triggered to be displayed, and the synthesized audio/video is triggered to be stored into the server by clicking the "release" button. The user then clicks the icon of the imitated audio/video in the interface of "My works" to trigger displaying of the work interface of the audio/video, and then views the synthesized audio/video.

Audio/video options are provided in the interface of "My works", and the synthesized audio/video stored in the server is triggered to be called and played by clicking the audio/video options. Besides the target video, the target audio, and the accompaniment displayed in the playing interface, the total human body action matching degree score, the total audio matching degree score, the comprehensive classification result, and the human body action matching degree score of the video and the audio matching degree score of the audio corresponding to a current playing time point are displayed in the video.

Therefore, while watching the audio/video, the user views the imitation action video of the user, hears the accompaniment and the audio recorded by the user, and also views the total audio score and the total video score of recording, the classification of the audio/video, and the scores of the video and the audio corresponding to the current playing time point.

In some embodiments, in the recording process, the score of each part of the audio and video is displayed in real time. The corresponding process is as follows:

for the display mode of the human body action matching degree score, the human body action matching degree score corresponding to the target image frame obtained through processing is displayed a preset period of time after the time point of the target image frame and the corresponding reference image frame is acquired, and the numerical value of the human body action matching degree score is displayed for a preset period of time in a recording interface in the form of a floating layer. For example, the technician presets the time interval between the adjacent target image frames and the display duration to 3 seconds. In the case that the computer device acquires the target image frame and the corresponding reference image frame in the 2nd second of the whole target video, the calculated human body action matching degree score of the target image frame is displayed in the 5th second, meanwhile, the next target image frame and the corresponding reference image frame are acquired in the 5th second, then the human body action matching degree score is updated in the 8th second, the human body action matching degree score corresponding to the target image frame is displayed, and so on.

Moreover, the target image frame and the corresponding reference image frame are processed upon being acquired, so as to calculate the human body action matching degree score, the human body action matching degree score is displayed in the recording interface in the form of a floating layer at the time point where the human body action matching degree score is calculated out, and updating is triggered upon obtaining the human body action matching degree score corresponding to the next target image frame. For example, the technician presets the time interval between the adjacent target image frames to a seconds. In the case that the computer device acquires a first target image frame and a corresponding reference image frame in the b-th second of the whole target video, the human body action matching degree score corresponding to the target image frame is displayed once being calculated out. The computer device acquires a second target image frame and a corresponding reference image frame in the (a+b)th second and then processes the second target image frame and the corresponding reference image frame to obtain the human body action matching degree score corresponding to the second target image frame, such that the human body action matching degree score in the recording interface is updated, the human body action matching degree score corresponding to the second target image frame is displayed, and so on. For such a display mode, the human body action matching degree score is displayed in a numerical form or a curve form. In the case that the human body action matching degree score is displayed in a numerical form, the human body action matching degree score is displayed in a recording interface and updated in real time. In the case that the human body action matching degree score is displayed in a curve form, a human body action matching degree score is calculated, a point corresponding to the human body action matching degree score is connected with a point corresponding to a previous human body action matching degree score, and the connecting line is drawn in the recording interface to form the human body action matching degree score curve. The whole human body action matching degree score curve synchronously moves rightwards in the recording interface during playback so as to ensure that the user sees the updated real-time human body action matching degree score every time. It should be understood that the human body action matching degree score curve starts at 0.

For a display mode of the audio matching degree scores, the audio matching degree scores are displayed in a numerical form or a curve form. In the case that the audio matching degree scores are displayed in a numerical form, audio matching degree scores corresponding to a preset number of target audio segments are calculated, and then an average value thereof is obtained and displayed; and upon obtaining an average value of audio matching degree scores corresponding to the next preset number of target audio segments, the displayed score is updated, and the newly calculated average value is displayed. In the case that the audio matching degree scores are displayed in a curve form, a lyric that the user is singing or is about to sing is displayed in the recording interface in real time during recording, and the color of the lyric is gradually changed into other colors along with the playing time. In the case that an audio frame is played, lyrics corresponding to audios prior to a time point corresponding to the audio frame are changed into other colors. As the user sings, each time a target audio segment is sung, a connecting line of the audio matching degree score corresponding to the target audio segment and the previous audio matching degree score, that is, the audio matching degree score curve, is displayed at a corresponding position above the lyric in the form of a floating layer. In the case that a whole line is sung, the displayed audio matching degree score curve is a connecting line of a plurality of audio matching degree scores corresponding to the whole line sung by the user, and then a new curve is generated upon appearance of the next line. It should be understood that each curve starts at 0, and that each time an audio matching degree score is generated, the curve extends to the right by a section until the next line appears, in which case a new curve starting at 0 is generated.

FIG. 3 is a flowchart of a method for determining a human body action matching degree according to some embodiments of the present disclosure. Referring to FIG. 3, the method includes the following processes:

In 301, target image frames acquired by an image acquisition device are acquired.

The target image frames are image frames acquired by the image acquisition device from a target video.

In the implementation, a user clicks on a terminal to run an application with video shooting and evaluation functions, so as to trigger displaying of a main interface of the application, wherein recommended popular video options and a search bar are provided in the main interface. The user clicks on an option of a video which is popular recently, or searches for a video which the user wants to imitate through the search bar and clicks an option of the video to trigger displaying of an interface of the to-be-imitated video, and the imitated video, that is, a reference video, is triggered to be displayed by clicking a "record" button of the video interface. In this case, the user imitates actions in the reference video, and an imitation video of the user, that is, a target video, is recorded through the image acquisition device called by the application. In this case, the reference video and the target video are simultaneously displayed in the interface of the application.

In some embodiments, the target image frames are all image frames in the target video, that is, all image frames in the target video are processed according to the process of the solutions. Alternatively, the target image frames are image frames periodically acquired from the target video, that is, only a part of the image frames in the target video are processed according to the process of the solutions. For example, for every 20 image frames, a first image frame in the 20 image frames is selected as the target image frame of the target video. The periodic acquisition of the target image frames does not have a great influence on determining the matching degree of imitation actions of the user, and the volume of data needing to be processed is not too large.

In some embodiments, in the above processing, in addition to acquiring the target image frames, corresponding reference image frames, that is, image frames of a video imitated by the user, are acquired. The corresponding processing method is as follows:

In a first method, upon acquiring the target image frames acquired by the image acquisition device, reference image frames, with the same playing time points as the target image frames in the target video, in the reference video are acquired.

In the implementation, the technician presets frame intervals of the target video and the reference video, and the frame intervals of the target video and the reference video are the same or different. In the case that the frame intervals of the target video and the reference video are the same, upon acquiring the target image frames through the image acquisition device, based on the playing time points of the target image frames in the target video, playing time points, closest to the playing time points, in the reference video are determined, and then image frames, at the playing time points, in the reference video are selected as the reference image frames corresponding to the target image frames. In the case that the frame intervals of the target video and the reference video are different, upon acquiring the target image frames through the image acquisition device, based on the playing time points of the target image frames, playing time points, the same as the playing time points, in the reference video are determined, and then image frames, closest to the playing time points, in the reference video are selected as the reference image frames corresponding to the target image frames.

In a second method, upon acquiring the target image frames acquired by the image acquisition device, reference image frames played at acquisition time points of the target image frames are acquired.

In the implementation, upon acquiring a target image frame through the image acquisition device, a clock time when the target image frame is acquired is determined, and then a difference value is obtained by comparing with the clock time when the reference video starts to be played, which is acquired in advance, wherein the difference value is a corresponding playing time point of the reference video frame in the reference video. Therefore, the reference image frame, corresponding to the playing time point, in the reference video is determined based on the difference value.

In 302, positions of a plurality of human body key points in the target image frame are determined.

The human body key points are human body characteristic points which display obvious characteristics of relative positions of each part during the motion of the human body, such as wrist points, ankle points, knee points, and elbow points.

Figure 4:
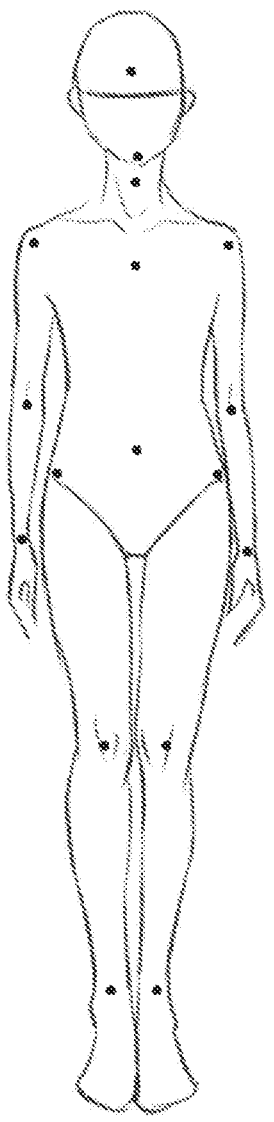
FIG. 4 is a schematic diagram of human body key points according to some embodiments of the present disclosure.

In the implementation, the technician presets a plurality of human body key points. In the embodiments of the present disclosure, 17 human body key points are set, as shown in FIG. 4, including a head point (i.e., a point between eyebrows), a throat point, a chest point, a navel point, a chin point, a left shoulder point, a right shoulder point, a left elbow point, a right elbow point, a left wrist point, a right wrist point, a left crotch point, a right crotch point, a left knee point, a right knee point, a left ankle point, and a right ankle point.

The technician carries out machine learning model training on the 17 human body key points in advance and then inputs the target image frame into a machine learning model, such that position coordinates of the 17 human body key points in the target image frame are output.

In 303, based on the positions of the plurality of human body key points in the target image frame, included angles between connecting lines of the same human body key points in the target image frame and the reference image frame are determined.

In the implementation, upon determining the positions of the plurality of human body key points in the target image frame, positions of the same human body key points in the reference image frame are also determined by using the machine learning model, to obtain position coordinates of 17 human body key points in the reference image frame. In this case, any two of the human body key points in the target image frame and the reference image frame are selected to be connected respectively. The two connecting lines are arranged in the same coordinate system, and one of the connecting lines is subjected to two-dimensional plane translation to enable one of the end points of the two connecting lines to be overlapped, in this case, the included angle between the two connecting lines is obtained. Or, the slopes of the connecting lines are obtained through the connecting line in the reference image frame, and then the included angle between the two connecting lines is calculated based on the slopes of the two connecting lines.

In some embodiments, one or more human body key points (e.g., a throat point or a navel point) with reference significance are set as a reference human body key point, and further, a connecting line between a non-reference key point and the reference key point is determined, so as to determine an included angle. Accordingly, the plurality of human body key points include a preset reference human body key point and non-reference human body key points. The process of step 303 is as follows:

for each of the non-reference human body key points, in the target image frame, a first connecting line of the non-reference human body key point and the reference human body key point is determined based on the position of the non-reference human body key point and the position of the reference human body key point, a second connecting line of the non-reference human body key point and the reference human body key point in the reference image frame is acquired, and an included angle between the first connecting line and the second connecting line is determined.

Figure 5:
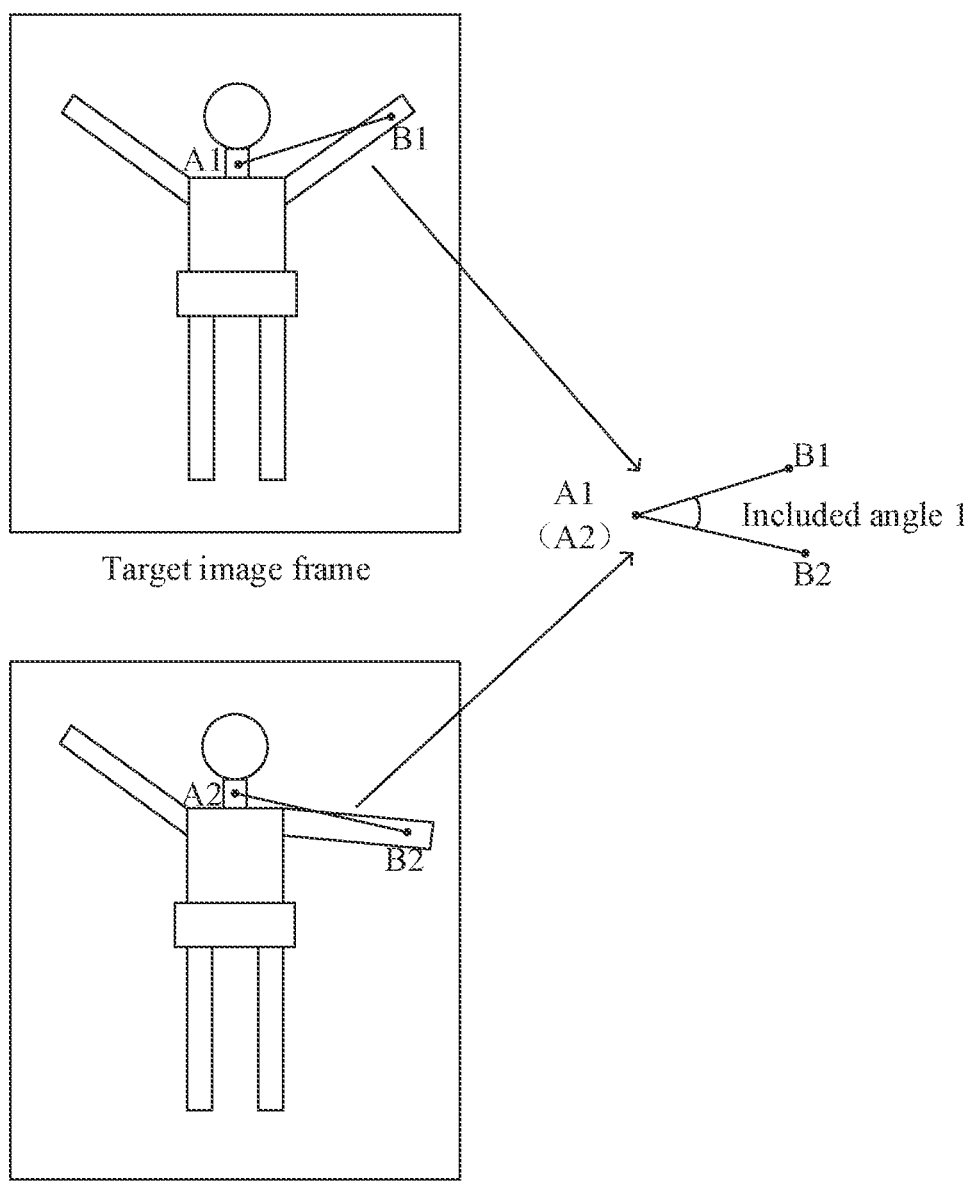
FIG. 5 is a schematic diagram of determining an included angle between a first connecting line and a second connecting line according to some embodiments of the present disclosure.

In the implementation, the technician presets one of the plurality of human body key points as the reference human body key point. In the embodiments, the throat point is selected as the reference human body key point, and the other 16 human body key points are selected as the non-reference human body key points. Based on the position coordinates of the 17 human body key points, the reference human body key point and one of the non-reference human body key points in the target image frame are connected to obtain the first connecting line, the reference human body key point and the same non-reference human body key point in the reference image frame are connected to obtain the second connecting line, and one of the connecting lines is translated in the same coordinate system to cause the reference human body key points (that is, the throat points in the embodiments) to coincide, such that the included angle between the first connecting line and the second connecting line is determined. For example, as shown in FIG. 5, for the throat point and the left wrist point, a first connecting line of the throat point A1 and the left wrist point B1 in the target image frame and a second connecting line of the throat point A2 and the left wrist point B2 in the reference image frame are acquired, in this case, the first connecting line is translated in the two-dimensional plane of the two connecting lines to cause the throat point A1 to coincide with the throat point A2, such that an included angle 1 of the two connecting lines is obtained, the included angle 1 being an included angle corresponding to the throat point and the left wrist point. With the same processing procedure, an included angle 2 corresponding to the throat point and the right wrist point, an included angle 3 corresponding to the throat point and the head point, an included angle 4 corresponding to the throat point and the chest point, and so on are obtained. In this case, a total of 16 included angles are obtained for the target image frame and the reference image frame.

In 304, based on the determined included angles, the human body action matching degree of the target image frame relative to the reference image frame is determined.

The human body action matching degree refers to a similarity of an action of the user relative to an action of a character in the imitated video.

In the implementation, upon determining the 16 included angles, according to logical reasoning, that is, the larger the included angle, the lower the human body action matching degree, the values of the included angles are converted to obtain processing result values corresponding to the 16 included angles, and then based on the 16 processing result values, a score which is fed back to the user to display the human body action matching degree of the user is determined.

In some embodiments, the process of determining the human body action matching degree of the target image frame relative to the reference image frame is as follows:

each of the determined included angles is processed based on a preset function to obtain a processing result value corresponding to each included angle; and the human body action matching degree of the target image frame relative to the reference image frame is determined based on the processing result value corresponding to each included angle.

In the implementation, upon determining the 16 included angles, the numerical value of each included angle is converted through a function preset by the technician, and converted into the processing result value that displays the integrity of an imitation action of the user. For example, the processing result value is calculated by the following formula (1):

$$y = \frac{\cos\theta + 1}{2} \qquad (1)$$

in the formula (1), y represents the processing result value, and θ represents the included angle.

The 16 included angles are respectively substituted into the formula to obtain 16 processing result values, and then an average value of the 16 processing result values is acquired as the human body action matching degree of the target image frame relative to the reference image frame. The human body action matching degree of the image frame is displayed on the interface of the application as a score, such that the user views the score of the action imitation degree in real time, so as to make adjustments.

Figure 6:
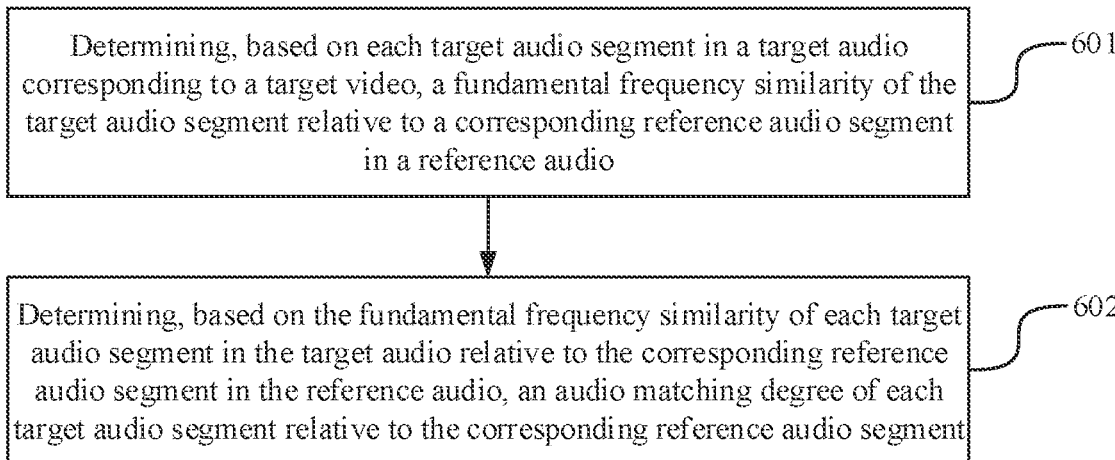
FIG. 6 is a flowchart of a method for determining an audio matching degree according to some embodiments of the present disclosure.

In the embodiments of the present disclosure, the above processing method for video scoring is provided, and in addition, a processing method for audio scoring is also provided. FIG. 6 is a flowchart of a method for determining an audio matching degree according to some embodiments of the present disclosure. Referring to FIG. 6, the process is as follows:

In 601, for each target audio segment in the target audio corresponding to the target video, a fundamental frequency similarity of the target audio segment relative to the corresponding reference audio segment in the reference audio is determined.

In the implementation, in addition to imitating a video and obtaining the score, the user also imitates an audio and obtains the score in the application. For example, the user selects Karaoke, or selects a mode of both dancing and singing, that is, imitating the corresponding reference audio while imitating the actions in the reference video. It should be noted that, in the embodiments of the present disclosure, the audio is acapella without accompaniment music, or a voice audio. The user selects an imitation file with both a video and an audio in the application, and clicks the "record" button to trigger playing of the reference video, the reference audio corresponding to the reference video, and the accompaniment audio. It may be understood that the reference audio corresponding to the reference video is played or not played according to an operation of the user in the interface, such that the user selects whether to record the target audio simultaneously while recording the target video. In this case, besides recording the video of the user, the sound of the user, that is, the target audio, is also recorded through a microphone of the terminal.

In the case that the audio matching degree of the target audio segment needs to be calculated, the fundamental frequencies of the target audio segment and the corresponding reference audio segment are acquired, and the fundamental frequency similarity between the target audio segment and the corresponding reference audio segment is determined by determining whether the fundamental frequency of the target audio segment and the corresponding fundamental frequency of the reference audio segment are consistent or within a difference value range.

In some embodiments, the process of determining the fundamental frequency similarity is as follows:

the reference audio segment, corresponding to the target audio segment, in the reference audio is determined; and a difference value between the fundamental frequency of each target audio frame in the target audio segment and the fundamental frequency of the corresponding reference audio frame in the reference audio segment is determined, and a proportion of the number of target audio frames with corresponding difference values being within a preset range to the total number of frames of the target audio segment is determined as the fundamental frequency similarity of the target audio segment relative to the corresponding reference audio segment in the reference audio.

In the implementation, the technician presets the reference audio and divides the reference audio into a plurality of reference audio segments. In some embodiments, a duration of each reference audio segment in the reference audio is the same or different. In the case that the user records the target audio, the corresponding target audio is also divided into a plurality of target audio segments based on the preset duration of each reference audio segment of the reference audio. It should be understood that the start time point and end time point of each target audio segment are the same as those of the corresponding reference audio segment.

The technician presets a duration corresponding to each frame in the reference audio, and then acquires a fundamental frequency corresponding to each audio frame. In this case, the fundamental frequencies of all audio frames in the target audio segment and the reference audio segment are acquired, the fundamental frequencies in the target audio segment are compared with the corresponding fundamental frequencies in the reference audio segment, respectively, that is, the fundamental frequency of each audio frame in the target audio segment is compared with the fundamental frequency of the corresponding audio frame in the reference audio segment, respectively, so as to obtain a fundamental frequency difference value between each audio frame in the target audio segment and the corresponding audio frame in the reference audio segment, and then the number of fundamental frequencies with the fundamental frequency difference values being within a preset range is calculated and compared with the total number of the fundamental frequencies in the target audio segment to obtain a proportion, that is, the fundamental frequency similarity of the target audio segment relative to the corresponding reference audio segment in the reference audio. For example, the target audio segment and the reference audio segment both include 1000 audio frames, that is, each of the target audio segment and the reference audio segment obtains 1000 fundamental frequency information difference values, and the preset fundamental frequency information difference value range is selected to be 8 hertz. In this case, in the case that 800 fundamental frequency information difference values are within the fundamental frequency information difference value range of 8 hertz, the fundamental frequency similarity of the target audio segment is 800/1000, that is, 0.8.

In 602, based on the fundamental frequency similarity of each target audio segment in the target audio relative to the corresponding reference audio segment in the reference audio, the audio matching degree of each target audio segment relative to the corresponding reference audio segment is determined.

In the implementation, in the case where the audio matching degree is determined based on the fundamental frequencies only, the fundamental frequency similarity of each target audio segment relative to the corresponding reference audio segment in the reference audio is the audio matching degree of each target audio segment relative to the corresponding reference audio segment.

During determining the audio matching degree between the target audio segment and the reference audio segment, in addition to considering the fundamental frequencies, whether the lyrics sung by the user are accurate is considered. Accordingly, the processing of step 602 is as follows:

for each target audio segment, a text similarity of the target audio segment relative to the corresponding reference audio segment in the reference audio is determined; and based on the fundamental frequency similarity and the text similarity of each target audio segment in the target audio relative to the corresponding reference audio segment in the reference audio, the audio matching degree of each target audio segment relative to the corresponding reference audio segment is determined.

In the implementation, upon determining the fundamental frequency similarity between each target audio segment and the reference audio segment, whether the lyrics of the user in the target audio segment are accurate is determined. The text similarity is obtained according to the text comparison between the target audio segment and the corresponding reference audio segment. In this case, the target audio segment has both the fundamental frequency similarity and the text similarity, and the audio matching degree of the target audio segment is obtained through processing.

In some embodiments, the process of determining the text similarity of the target audio segment is as follows:

text recognition is performed on the target audio segment to obtain a target recognition text; the reference audio segment, corresponding to the target audio segment, in the reference audio is determined, and a reference recognition text corresponding to the reference audio segment is acquired; and a similarity between the target recognition text and the reference recognition text is taken as the text similarity of the target audio segment relative to the corresponding reference audio segment in the reference audio.

In the implementation, a voice text of the user in the target audio segment, that is, the target recognition text, is acquired through a speech recognition technology, and then a text of the reference audio segment corresponding to the target audio segment, that is, the reference recognition text, is acquired. The reference recognition text is pre-stored by the technician. The target recognition text is compared with the reference recognition text, and the text similarity is determined according to whether each word and the sequence are consistent. For example, the pre-stored text of the reference audio segment is "What a nice day today", while the text of a user voice acquired by the speech recognition technology is "What a nice day", and the user does not sing the word "today", so the text similarity is 4/5. Alternately, the pre-stored text of the reference audio segment is "What a nice day today", while the text of the user voice acquired by the speech recognition technology is "What a nice day today we have", and the user sings two more words "we have", so the text similarity is 5/7. For another example, the pre-stored text of the reference audio segment is "What a nice day today", while the text of the user voice acquired by the speech recognition technology is "What a nice weather today", and the user sings the wrong word "weather" instead of "day", so the text similarity is 4/5.

In addition, the Euclidean distance between the target recognition text and the reference recognition text is directly calculated as the similarity.

Upon determining the fundamental frequency similarity and the text similarity of each target audio segment in the target audio relative to the corresponding reference audio segment in the reference audio, weighting is performed on the fundamental frequency similarity and the text similarity to obtain the audio matching degree of the target audio segment relative to the corresponding reference audio segment. For example, in the case that the fundamental frequency similarity of the target audio segment relative to the corresponding reference audio segment in the reference audio is 0.8, the text similarity is 1, and preset weighting weights of the fundamental frequency similarity and the text similarity are 0.4 and 0.6, respectively, the audio matching degree of the target audio segment relative to the corresponding reference audio segment is 0.8×0.4+1×0.6, that is, 0.92.

All the above optional technical solutions can be combined in any way to form some embodiments of the present disclosure, which are not repeated here.

In the solutions according to the embodiments of the present disclosure, the target audio and the target video can be acquired, the total human body action matching degree score of the target video relative to the reference video is determined based on the human body action matching degree of each target image frame in the target video relative to the corresponding reference image frame in the reference video, the total audio matching degree score of the target audio relative to the reference audio is determined based on the audio matching degree of each target audio segment in the target audio relative to the corresponding reference audio segment in the reference audio, and then the comprehensive classification result is determined based on the total human body action matching degree score and the total audio matching degree score. The comprehensive classification result can reflect the overall imitation of a video and an audio, such that the method according to the embodiments of the present disclosure can classify the imitation of the singing and dancing video.

Figure 7:
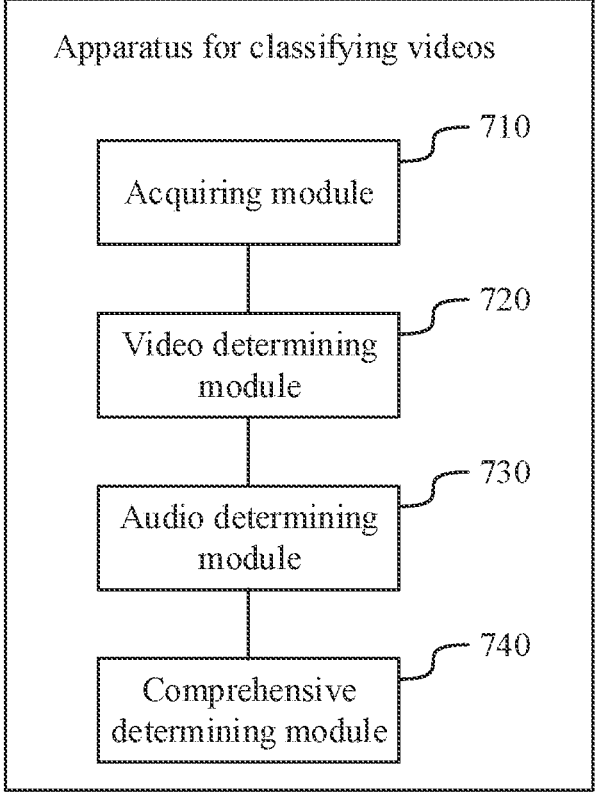
FIG. 7 is a schematic structural diagram of an apparatus for classifying videos according to some embodiments of the present disclosure.

The embodiments of the present disclosure provide an apparatus for classifying videos. The apparatus is the computer device in the above embodiments. As shown in FIG. 7, the apparatus includes:

an acquiring module 710, configured to acquire a target audio and a corresponding target video including human body actions;

a video determining module 720, configured to determine, based on a human body action matching degree of each target image frame in the target video relative to a corresponding reference image frame in a reference video, a total human body action matching degree score of the target video relative to the reference video;

an audio determining module 730, configured to determine, based on an audio matching degree of each target audio segment in the target audio relative to a corresponding reference audio segment in a reference audio, a total audio matching degree score of the target audio relative to the reference audio, wherein the reference audio is an audio corresponding to the reference video; and a comprehensive determining module 740, configured to determine, based on the total human body action matching degree score and the total audio matching degree score, a comprehensive classification result.

In some embodiments, the apparatus further includes:

a first determining module, configured to determine a human body action matching degree score corresponding to a human body action matching degree of the target image frame relative to the reference image frame, and determine an audio matching degree score corresponding to an audio matching degree of the target audio segment relative to the reference audio segment; and a first displaying module, configured to display a human body action matching degree score curve based on the human body action matching degree score corresponding to each target image frame, and display an audio matching degree score curve based on the audio matching degree score corresponding to each target audio segment.

In some embodiments, the apparatus further includes:

a second displaying module, configured to display a time axis corresponding to the target video and the target audio;

determine, in response to receiving an instruction of selecting a target time point on the time axis, a target image frame and a target audio segment corresponding to the target time point; and display a human body action matching degree score of the target image frame corresponding to the target time point and an audio matching degree score of the target audio segment corresponding to the target time point.

In some embodiments, the apparatus further includes:

a first determining module, configured to determine, based on the human body action matching degree of the target image frame relative to the reference image frame, a human body action matching degree score corresponding to the target image frame; and a first adding module, configured to add the human body action matching degree score to a position, corresponding to the target image frame, in the target video in a form of an image.

In some embodiments, the apparatus further includes:

a first determining module, configured to determine, based on the audio matching degree of the target audio segment relative to the reference audio segment, an audio matching degree score corresponding to the target audio segment; and a second adding module, configured to add the audio matching degree score to a position, corresponding to the target audio segment, in the target video in a form of an image.

In some embodiments, the first determining module is further configured to:

acquire the target image frames from the target video at a preset first time interval; determine, in response to acquiring every target image frame, positions of a plurality of human body key points in the target image frame; determine, based on the positions of the plurality of human body key points in the target image frame, included angles between connecting lines of the same human body key points in the target image frame and the reference image frame; and determine, based on the determined included angles, the human body action matching degree of the target image frame relative to the reference image frame.

In some embodiments, the plurality of human body key points include a preset reference human body key point and non-reference human body key points. The first determining module is configured to:

for each of the non-reference human body key points, in the target image frame, determine a first connecting line of the non-reference human body key point and the reference human body key point based on the position of the non-reference human body key point and the position of the reference human body key point; acquire a second connecting line of the non-reference human body key point and the reference human body key point in the reference image frame; and determine an included angle between the first connecting line and the second connecting line.

In some embodiments, the first determining module is further configured to:

acquire reference image frames, with the same playing time points as the target image frames in the target video, in the reference video; or, acquire reference image frames played at acquisition time points of the target image frames.

In some embodiments, the first determining module is further configured to:

acquire a processing result value corresponding to each included angle by processing each of the determined included angles based on a preset function; and determine the human body action matching degree of the target image frame relative to the reference image frame based on the processing result value corresponding to each included angle.

In some embodiments, the first determining module is further configured to:

acquire the target audio segments in the target audio one by one; determine, in response to acquiring every target audio segment, a fundamental frequency similarity of the target audio segment relative to the corresponding reference audio segment in the reference audio; and determine, based on the fundamental frequency similarity of the target audio segment relative to the corresponding reference audio segment in the reference audio, an audio matching degree of the target audio segment relative to the corresponding reference audio segment.

In some embodiments, the first determining module is configured to:

determine the reference audio segment, corresponding to the target audio segment, in the reference audio; and determine a difference value between the fundamental frequency of each target audio frame in the target audio segment and the fundamental frequency of the corresponding reference audio frame in the reference audio segment, and determine a proportion of the number of target audio frames with corresponding difference values being within a preset range to the total number of frames of the target audio segment as the fundamental frequency similarity of the target audio segment relative to the corresponding reference audio segment in the reference audio.

In some embodiments, the first determining module is further configured to:

determine a text similarity of the target audio segment relative to the corresponding reference audio segment in the reference audio, wherein determining, based on the fundamental frequency similarity of the target audio segment relative to the corresponding reference audio segment in the reference audio, the audio matching degree of the target audio segment relative to the corresponding reference audio segment includes:

determining, based on the fundamental frequency similarity and the text similarity of the target audio segment relative to the corresponding reference audio segment in the reference audio, the audio matching degree of the target audio segment relative to the corresponding reference audio segment.

In some embodiments, the first determining module is configured to:

acquire a target recognition text by performing text recognition on the target audio segment;

determine the reference audio segment, corresponding to the target audio segment, in the reference audio, and acquire a reference recognition text corresponding to the reference audio segment; and take a similarity between the target recognition text and the reference recognition text as the text similarity of the target audio segment relative to the corresponding reference audio segment in the reference audio.

In the solutions according to the embodiments of the present disclosure, the target audio and the target video can be acquired, the total human body action matching degree score of the target video relative to the reference video is determined based on the human body action matching degree of each target image frame in the target video relative to the corresponding reference image frame in the reference video, the total audio matching degree score of the target audio relative to the reference audio is determined based on the audio matching degree of each target audio segment in the target audio relative to the corresponding reference audio segment in the reference audio, and then the comprehensive classification result is determined based on the total human body action matching degree score and the total audio matching degree score. The comprehensive classification result can reflect the overall imitation of a video and an audio, such that the method according to the embodiments of the present disclosure can classify the imitation of the singing and dancing video.

It is to be noted that, in the case that the apparatus for classifying videos according to the above embodiments performs video classification, the division of the functional modules is merely exemplary. In practice, the above functions can be assigned to different functional modules according to needs, that is, the internal structure of the apparatus is divided into different functional modules, so as to implement all or a part of the above functions. In addition, the apparatus for classifying videos according to the above embodiments belongs to the same concept as the embodiments of the method for classifying videos, and specific implementation processes thereof are described in the method embodiments in detail, which are not repeated here.

Figure 8:
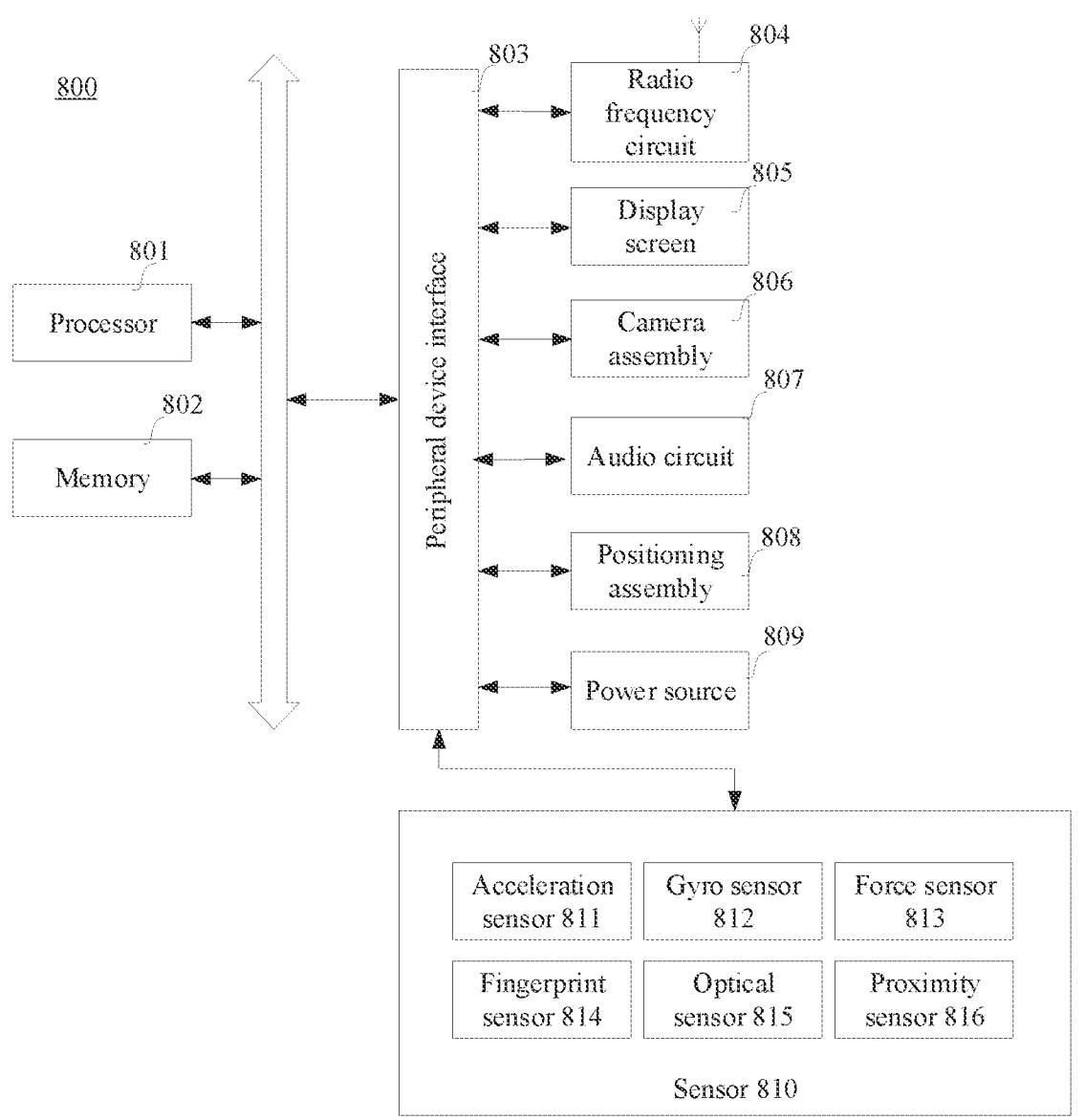
FIG. 8 is a structural block diagram of a terminal according to some embodiments of the present disclosure.

FIG. 8 shows a structural block diagram of a terminal 800 according to some embodiments of the present disclosure. The terminal is the computer device in the above embodiments. The terminal 800 is: a smart phone, a tablet computer, a moving picture experts group audio layer III (MP3) player, a moving picture experts group audio layer IV (MP4) player, a notebook computer, or a desktop computer. The terminal 800 is also referred to as user equipment, a portable terminal, a laptop terminal, a desktop terminal, or the like.

Generally, the terminal 800 includes a processor 801 and a memory 802.

The processor 801 includes one or more processing cores, such as a 4-core processor and an 8-core processor. The processor 801 is implemented by at least one of hardware forms of a digital signal processor (DSP), a field-programmable gate array (FPGA), and a programmable logic array (PLA). The processor 801 also includes a main processor and a coprocessor. The main processor is a processor for processing data in an awake state, and is also referred to as a central processing unit (CPU). The coprocessor is a low-power-consumption processor for processing the data in a standby state. In some embodiments, the processor 801 is integrated with a graphics processing unit (GPU), which is configured to render and draw the content that needs to be displayed on a display screen. In some embodiments, the processor 801 further includes an artificial intelligence (AI) processor for processing computational operations related to machine learning.

The memory 802 includes one or more computer-readable storage media, which is non-transitory. The memory 802 further includes a high-speed random access memory, as well as a non-volatile memory, such as one or more magnetic disk storage devices and flash storage devices. In some embodiments, a non-transitory computer-readable storage medium in the memory 802 is configured to store at least one instruction. The at least one instruction is configured to be executed by the processor 801 to perform the method for classifying videos according to the method embodiments of the present disclosure.

In some embodiments, the terminal 800 further optionally includes a peripheral device interface 803 and at least one peripheral device. The processor 801, the memory 802, and the peripheral device interface 803 are connected via buses or signal lines. Each peripheral device is connected to the peripheral device interface 803 via a bus, signal line, or a circuit board. In some embodiments, the peripheral devices include at least one of a radio frequency circuit 804, a display screen 805, a camera assembly 806, an audio circuit 807, a positioning assembly 808, and a power source 809.

The peripheral device interface 803 is configured to connect at least one peripheral device associated with an input/output (I/O) to the processor 801 and the memory 802. In some embodiments, the processor 801, the memory 802, and the peripheral device interface 803 are integrated on the same chip or circuit board. In some other embodiments, any one or two of the processor 801, the memory 802, and the peripheral device interface 803 are implemented on a separate chip or circuit board, which is not limited in the embodiments of the present disclosure.

The radio frequency circuit 804 is configured to receive and transmit a radio frequency (RF) signal, which is also referred to as an electromagnetic signal. The radio frequency circuit 804 is communicated with a communication network and other communication devices via electromagnetic signals. The radio frequency circuit 804 converts an electrical signal into an electromagnetic signal for transmission or converts the received electromagnetic signal into an electrical signal. In some embodiments, the radio frequency circuit 804 includes an antenna system, an RF transceiver, one or more amplifiers, a tuner, an oscillator, a digital signal processor, a coder/decoder (codec) chipset, a subscriber identity module card, and the like. The radio frequency circuit 804 is communicated with other terminals via at least one wireless communication protocol. The wireless communication protocol includes, but is not limited to, a metropolitan area network, various generations of mobile communication networks (2G, 3G, 4G, and 5G), a wireless local area network, and/or a wireless fidelity (Wi-Fi) network. In some embodiments, the radio frequency circuit 804 further includes a near field communication (NFC) related circuit, which is not limited in the present disclosure.

The display screen 805 is configured to display a user interface (UI). The UI includes graphics, text, icons, videos, and any combination thereof. In the case that the display screen 805 is a touch display screen, the display screen 805 also has the capacity to acquire a touch signal on or over a surface of the display screen 805. The touch signal is input to the processor 801 as a control signal for processing. In this case, the display screen 805 is also configured to provide virtual buttons and/or virtual keyboards, which are also referred to as soft buttons and/or soft keyboards. In some embodiments, there is one display screen 805 disposed on a front panel of the terminal 800; in some other embodiments, there are at least two display screens 805 disposed on different surfaces of the terminal 800 respectively or in a folded design. In some still other embodiments, the display screen 805 is a flexible display screen disposed on a curved surface or a folded surface of the terminal 800. Moreover, the display screen 805 may have an irregular shape other than a rectangle, that is, an irregular-shaped screen. The display screen 805 is prepared by using a material such as a liquid crystal display (LCD) or an organic light-emitting diode (OLED).

The camera assembly 806 is configured to capture images or videos. Optionally, the camera assembly 806 includes a front camera and a rear camera. Generally, the front camera is disposed on the front panel of the terminal and the rear camera is disposed on a back side of the terminal. In some embodiments, there are at least two rear cameras, and each of the at least two rear cameras is any one of a main camera, a depth-of-field camera, a wide-angle camera, and a telephoto camera, to realize a background blurring function realized by fusion of the main camera and the depth-of-field camera, panoramic shooting and virtual reality (VR) shooting functions by fusion of the main camera and the wide-angle camera, or other fusion shooting functions. In some embodiments, the camera assembly 806 further includes a flashlight. The flashlight is a mono-color temperature flashlight or a two-color temperature flashlight. The two-color temperature flashlight is a combination of a warm flashlight and a cold flashlight, and can be used for light compensation at different color temperatures.

The audio circuit 807 includes a microphone and a loudspeaker. The microphone is configured to acquire sound waves of users and the environment, and convert the sound waves into electrical signals which are input into the processor 801 for processing, or input into the radio frequency circuit 804 for voice communication. For stereo acquisition or noise reduction, there are a plurality of microphones, which are respectively disposed at different parts of the terminal 800. The microphone is also an array microphone or an omnidirectional acquisition microphone. The loudspeaker is configured to convert the electrical signal from the processor 801 or the radio frequency circuit 804 into the sound waves. The loudspeaker is a conventional film loudspeaker or a piezoelectric ceramic loudspeaker. In the case that the loudspeaker is the piezoelectric ceramic speaker, the electrical signals can be converted into not only human-audible sound waves but also the sound waves which are inaudible to humans for ranging and the like. In some embodiments, the audio circuit 807 further includes a headphone jack.

The positioning assembly 808 is configured to locate a current geographic location of the terminal 800 to implement navigation or a location-based service (LBS). The positioning assembly 808 is the United States' global positioning system (GPS), China's BeiDou navigation satellite system, Russia's global navigation satellite system, or the European Union's Galileo system.

The power source 809 is configured to supply power for various components in the terminal 800. The power source 809 is an alternating current, a direct current, a disposable battery, or a rechargeable battery. In the case that the power source 809 includes the rechargeable battery, the rechargeable battery supports wired charging or wireless charging. The rechargeable battery also supports the fast-charging technology.

In some embodiments, the terminal 800 further includes one or more sensors 810. The one or more sensors 810 include, but are not limited to, an acceleration sensor 811, a gyro sensor 812, a force sensor 813, a fingerprint sensor 814, an optical sensor 815, and a proximity sensor 816.

The acceleration sensor 811 is configured to detect magnitudes of accelerations on three coordinate axes of a coordinate system established by the terminal 800. For example, the acceleration sensor 811 is configured to detect components of gravitational acceleration on the three coordinate axes. The processor 801 controls the display screen 805 to display a user interface in a landscape view or a portrait view based on a gravity acceleration signal acquired by the acceleration sensor 811. The acceleration sensor 811 is also configured to acquire motion data of a game or a user.

The gyro sensor 812 is configured to detect a body direction and a rotation angle of the terminal 800, and cooperates with the acceleration sensor 811 to acquire a 3D motion of the user on the terminal 800. Based on the data acquired by the gyro sensor 812, the processor 801 achieves the following functions: motion sensing (for example, changing the UI according to a user's tilting operation), image stabilization during shooting, game control, and inertial navigation.

The force sensor 813 is disposed at a side frame of the terminal 800 and/or a lower layer of the display screen 805. In the case that the force sensor 813 is disposed on the side frame of the terminal 800, a user's holding signal to the terminal 800 can be detected, and the processor 801 can perform left-right hand recognition or quick operation according to the holding signal acquired by the force sensor 813. In the case that the force sensor 813 is disposed on the lower layer of the display screen 805, the processor 801 controls an operability control on the UI based on a user's press operation on the display screen 805. The operability control includes at least one of a button control, a scroll bar control, an icon control, and a menu control.

The fingerprint sensor 814 is configured to acquire a user's fingerprint, and the processor 801 identifies the user's identity based on the fingerprint acquired by the fingerprint sensor 814, or the fingerprint sensor 814 identifies the user's identity based on the acquired fingerprint. In the case that the user's identity is identified as trusted, the processor 801 authorizes the user to perform related sensitive operations, such as unlocking the screen, viewing encrypted information, downloading software, paying, and changing settings. The fingerprint sensor 814 is disposed on the front side, back side, or side surface of the terminal 800. In the case that a physical key or a manufacturer logo is provided on the terminal 800, the fingerprint sensor 814 is integrated with the physical key or the manufacturer's logo.

The optical sensor 815 is configured to acquire ambient light intensity. In some embodiments, the processor 801 controls the display brightness of the display screen 805 based on the ambient light intensity acquired by the optical sensor 815. In some embodiments, in the case that the ambient light intensity is higher, the display brightness of the display screen 805 is increased; and in the case that the ambient light intensity is lower, the display brightness of the display screen 805 is decreased. In another embodiment, the processor 801 also dynamically adjusts the shooting parameters of the camera assembly 806 based on the ambient light intensity acquired by the optical sensor 815.

The proximity sensor 816, also referred to as a distance sensor, is usually disposed on the front panel of the terminal 800. The proximity sensor 816 is configured to acquire a distance between the user and the front side of the terminal 800. In some embodiments, in the case that the proximity sensor 816 detects that the distance between the user and the front side of the terminal 800 is gradually decreasing, the processor 801 controls the display screen 805 to switch from a screen-on state to a screen-off state; and in the case that the proximity sensor 816 detects that the distance between the user and the front side of the terminal 800 is gradually increasing, the processor 801 controls the display screen 805 to switch from the screen-off state into the screen-on state.

Those skilled in the art can appreciate that the structure illustrated in FIG. 8 does not constitute limitation of the terminal 800, and that more or fewer components than those illustrated are included, or some of the components are combined, or a different arrangement of components is employed.

Figure 9:
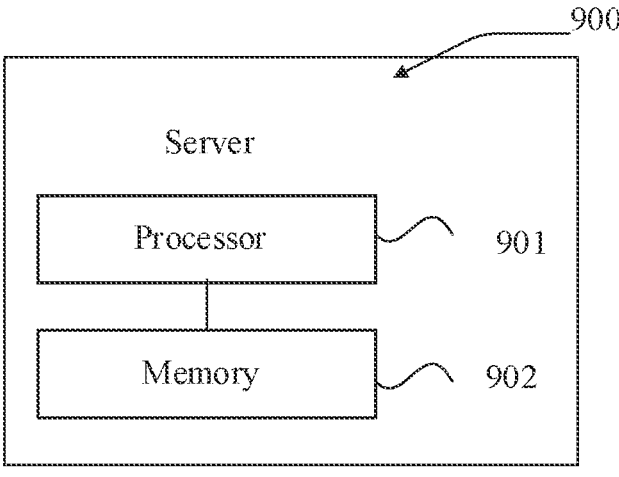
FIG. 9 is a structural block diagram of a server according to some embodiments of the present disclosure.

FIG. 9 is a schematic structural diagram of a server according to some embodiments of the present disclosure. The server 900 varies greatly depending on configuration or performance, and includes one or more central processing units (CPUs) 901 and one or more memories 902. The memory 902 stores at least one instruction, wherein the at least one instruction, when loaded and executed by the central processing unit 901, causes the central processing unit 901 to perform the method according to the above method embodiments. In addition, the server further has a wired or wireless network interface, a keyboard, an input/output interface, and other components to facilitate input and output. The server further includes other components for implementing functions of the device, which are not repeated here.

In some embodiments, a computer-readable storage medium, such as a memory including instructions, is further provided. The instructions are executable by a processor in a terminal to perform the method for classifying videos according to the above embodiments. The computer-readable storage medium is non-transitory. For example, the computer-readable storage medium is a read-only memory (ROM), a random access memory (RAM), a CD-ROM, a magnetic tape, a floppy disk, an optical data storage device, and the like.

It will be appreciated by those of ordinary skill in the art that all or a part of the steps for implementing the above embodiments is completed by hardware, or is completed by instructing relevant hardware by a program stored in a computer-readable storage medium. The storage medium mentioned above is a read-only memory, a magnetic disk, a compact disk, or the like.

Described above are merely preferred embodiments of the present disclosure and are not intended to limit the present disclosure. Any modifications, equivalents, improvements, and the like made within the spirit and principle of the present disclosure should fall within the protection scope of the present disclosure.

What is claimed is:

1. A method for classifying videos, comprising:
   acquiring a target audio and a corresponding target video comprising human body actions;
   determining, based on a human body action matching degree of each target image frame in the target video relative to a corresponding reference image frame in a reference video, a total human body action matching degree score of the target video relative to the reference video;
   determining, based on an audio matching degree of each target audio segment in the target audio relative to a corresponding reference audio segment in a reference audio, a total audio matching degree score of the target audio relative to the reference audio, wherein the reference audio is an audio corresponding to the reference video;
   determining, based on the total human body action matching degree score and the total audio matching degree score, a comprehensive classification result; and
   generating a synthesized audio-video by synthesizing the target audio, an accompaniment, and the target video that is embedded with the total human body action matching degree score, the total audio matching degree score, and the comprehensive classification result in a form of pictures.

2. The method for classifying videos according to claim 1, further comprising:
   for each target image frame, determining a human body action matching degree score corresponding to a human body action matching degree of the target image frame relative to the corresponding reference image frame; and for each target audio segment, determining an audio matching degree score corresponding to an audio matching degree of the target audio segment relative to the corresponding reference audio segment; and
   displaying a human body action matching degree score curve based on the human body action matching degree score corresponding to each target image frame, and displaying an audio matching degree score curve based on the audio matching degree score corresponding to each target audio segment.

3. The method for classifying videos according to claim 2, further comprising:

displaying a time axis corresponding to the target video and the target audio;

determining, in response to receiving an instruction of selecting a target time point on the time axis, a target image frame and a target audio segment corresponding to the target time point; and displaying a human body action matching degree score of the target image frame corresponding to the target time point and an audio matching degree score of the target audio segment corresponding to the target time point.

4. The method for classifying videos according to claim 1, further comprising:

for each target image frame, determining, based on the human body action matching degree of the target image frame relative to the corresponding reference image frame, a human body action matching degree score corresponding to the target image frame; and adding the human body action matching degree score to a position, corresponding to the target image frame, in the target video in a form of an image.

5. The method for classifying videos according to claim 1, further comprising:

for each target audio segment, determining, based on the audio matching degree of the target audio segment relative to the corresponding reference audio segment, an audio matching degree score corresponding to the target audio segment; and adding the audio matching degree score to a position, corresponding to the target audio segment, in the target video in a form of an image.

6. The method for classifying videos according to claim 1, wherein prior to determining, based on the human body action matching degree of each target image frame in the target video relative to the corresponding reference image frame in the reference video, the total human body action matching degree score of the target video relative to the reference video, the method further comprises:

acquiring the target image frames from the target video at a preset first time interval; determining, in response to acquiring every target image frame, positions of a plurality of human body key points in the target image frame; determining, based on the positions of the plurality of human body key points in the target image frame, included angles between connecting lines of the same human body key points in the target image frame and the reference image frame; and determining, based on the determined included angles, a human body action matching degree of the target image frame relative to the reference image frame.

7. The method for classifying videos according to claim 1, wherein prior to determining, based on the audio matching degree of each target audio segment in the target audio relative to the corresponding reference audio segment in the reference audio, the total audio matching degree score of the target audio relative to the reference audio, the method further comprises:

acquiring the target audio segments in the target audio one by one; determining, in response to acquiring every target audio segment, a fundamental frequency similarity of the target audio segment relative to the corresponding reference audio segment in the reference audio; and determining, based on the fundamental frequency similarity of the target audio segment relative to the corresponding reference audio segment in the reference audio, an audio matching degree of the target audio segment relative to the corresponding reference audio segment.

8. The method for classifying videos according to claim 7, further comprising:

determining a text similarity of the target audio segment relative to the corresponding reference audio segment in the reference audio, wherein determining, based on the fundamental frequency similarity of the target audio segment relative to the corresponding reference audio segment in the reference audio, the audio matching degree of the target audio segment relative to the corresponding reference audio segment comprises:

determining, based on the fundamental frequency similarity and the text similarity of the target audio segment relative to the corresponding reference audio segment in the reference audio, the audio matching degree of the target audio segment relative to the corresponding reference audio segment.

9. An apparatus for classifying videos, comprising:

a processor; and a memory configured to store one or more instructions executable by the processor;

wherein the processor, when loading and executing the one or more instructions, is caused to perform:

acquiring a target audio and a corresponding target video comprising human body actions;

determining, based on a human body action matching degree of each target image frame in the target video relative to a corresponding reference image frame in a reference video, a total human body action matching degree score of the target video relative to the reference video;

determining, based on an audio matching degree of each target audio segment in the target audio relative to a corresponding reference audio segment in a reference audio, a total audio matching degree score of the target audio relative to the reference audio, wherein the reference audio is an audio corresponding to the reference video;

determining, based on the total human body action matching degree score and the total audio matching degree score, a comprehensive classification result; and generating a synthesized audio-video by synthesizing the target audio, an accompaniment, and the target video that is embedded with the total human body action matching degree score, the total audio matching degree score, and the comprehensive classification result in a form of pictures.

10. A computer device comprising a processor and a memory for storing at least one instruction, wherein the at least one instruction, when loaded and executed by the processor, causes the processor to perform:

acquiring a target audio and a corresponding target video comprising human body actions;

determining, based on a human body action matching degree of each target image frame in the target video relative to a corresponding reference image frame in a reference video, a total human body action matching degree score of the target video relative to the reference video;

determining, based on an audio matching degree of each target audio segment in the target audio relative to a corresponding reference audio segment in a reference audio, a total audio matching degree score of the target audio relative to the reference audio, wherein the reference audio is an audio corresponding to the reference video;

determining, based on the total human body action matching degree score and the total audio matching degree score, a comprehensive classification result; and generating a synthesized audio-video by synthesizing the target audio, an accompaniment, and the target video that is embedded with the total human body action matching degree score, the total audio matching degree score, and the comprehensive classification result in a form of pictures.

11. A non-transitory computer-readable storage medium storing at least one instruction therein, wherein the at least one instruction, when loaded and executed by a processor, causes the processor to perform the method for classifying videos as defined in claim 1.

12. The apparatus for classifying videos according to claim 9, wherein the processor, when loading and executing the one or more instructions, is caused to perform:

for each target image frame, determining a human body action matching degree score corresponding to a human body action matching degree of the target image frame relative to the corresponding reference image frame; and for each target audio segment, determining an audio matching degree score corresponding to an audio matching degree of the target audio segment relative to the corresponding reference audio segment; and displaying a human body action matching degree score curve based on the human body action matching degree score corresponding to each target image frame, and displaying an audio matching degree score curve based on the audio matching degree score corresponding to each target audio segment.

13. The apparatus for classifying videos according to claim 12, wherein the processor, when loading and executing the one or more instructions, is caused to perform:

displaying a time axis corresponding to the target video and the target audio;

determining, in response to receiving an instruction of selecting a target time point on the time axis, a target image frame and a target audio segment corresponding to the target time point; and displaying a human body action matching degree score of the target image frame corresponding to the target time point and an audio matching degree score of the target audio segment corresponding to the target time point.

14. The apparatus for classifying videos according to claim 9, wherein the processor, when loading and executing the one or more instructions, is caused to perform:

for each target image frame, determining, based on the human body action matching degree of the target image frame relative to the corresponding reference image frame, a human body action matching degree score corresponding to the target image frame; and adding the human body action matching degree score to a position, corresponding to the target image frame, in the target video in a form of an image.

15. The apparatus for classifying videos according to claim 9, wherein the processor, when loading and executing the one or more instructions, is caused to perform:

for each target audio segment, determining, based on the audio matching degree of the target audio segment relative to the corresponding reference audio segment, an audio matching degree score corresponding to the target audio segment; and adding the audio matching degree score to a position, corresponding to the target audio segment, in the target video in a form of an image.

16. The apparatus for classifying videos according to claim 9, wherein the processor, when loading and executing the one or more instructions, is caused to perform:

acquiring the target image frames from the target video at a preset first time interval; determining, in response to acquiring every target image frame, positions of a plurality of human body key points in the target image frame; determining, based on the positions of the plurality of human body key points in the target image frame, included angles between connecting lines of the same human body key points in the target image frame and the reference image frame; and determining, based on the determined included angles, a human body action matching degree of the target image frame relative to the reference image frame.

17. The apparatus for classifying videos according to claim 9, wherein the processor, when loading and executing the one or more instructions, is caused to perform:

acquiring the target audio segments in the target audio one by one; determining, in response to acquiring every target audio segment, a fundamental frequency similarity of the target audio segment relative to the corresponding reference audio segment in the reference audio; and determining, based on the fundamental frequency similarity of the target audio segment relative to the corresponding reference audio segment in the reference audio, an audio matching degree of the target audio segment relative to the corresponding reference audio segment.

18. The apparatus for classifying videos according to claim 17, wherein the processor, when loading and executing the one or more instructions, is caused to perform:

determining a text similarity of the target audio segment relative to the corresponding reference audio segment in the reference audio, wherein determining, based on the fundamental frequency similarity of the target audio segment relative to the corresponding reference audio segment in the reference audio, the audio matching degree of the target audio segment relative to the corresponding reference audio segment comprises:

determining, based on the fundamental frequency similarity and the text similarity of the target audio segment relative to the corresponding reference audio segment in the reference audio, the audio matching degree of the target audio segment relative to the corresponding reference audio segment.

19. The computer device according to claim 10, wherein the at least one instruction, when loaded and executed by the processor, causes the processor to perform:

for each target image frame, determining a human body action matching degree score corresponding to a human body action matching degree of the target image frame relative to the corresponding reference image frame; and for each target audio segment, determining an audio matching degree score corresponding to an audio matching degree of the target audio segment relative to the corresponding reference audio segment; and displaying a human body action matching degree score curve based on the human body action matching degree score corresponding to each target image frame, and displaying an audio matching degree score curve based on the audio matching degree score corresponding to each target audio segment.

20. The computer device according to claim 19, wherein the at least one instruction, when loaded and executed by the processor, causes the processor to perform:

displaying a time axis corresponding to the target video and the target audio;

determining, in response to receiving an instruction of selecting a target time point on the time axis, a target image frame and a target audio segment corresponding to the target time point; and displaying a human body action matching degree score of the target image frame corresponding to the target time point and an audio matching degree score of the target audio segment corresponding to the target time point.

\* \* \* \* \*